United States Patent
Lee et al.

(10) Patent No.: US 10,156,935 B2
(45) Date of Patent: Dec. 18, 2018

(54) TOUCH SCREEN CONTROLLER, TOUCH SENSING DEVICE, AND TOUCH SENSING METHOD

(71) Applicant: SAMSUNG ELECTRONICS CO., LTD., Suwon-si (KR)

(72) Inventors: Kyeong-gon Lee, Hwaseong-si (KR); Bum-soo Kim, Seoul (KR); Jun-chul Park, Daegu (KR); Yoon-kyung Choi, Seoul (KR); San-ho Byun, Bucheon-si (KR); Cha-dong Kim, Gwacheon-si (KR); Jin-chul Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 24 days.

(21) Appl. No.: 15/189,528

(22) Filed: Jun. 22, 2016

(65) Prior Publication Data

US 2016/0370948 A1 Dec. 22, 2016

Related U.S. Application Data

(60) Provisional application No. 62/182,721, filed on Jun. 22, 2015.

(30) Foreign Application Priority Data

Jan. 15, 2016 (KR) .......................... 10-2016-0005316

(51) Int. Cl.
*G06F 3/045* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04101* (2013.01)

(58) Field of Classification Search
CPC .............................. G06F 3/0416; G06F 3/044
See application file for complete search history.

(56) References Cited

U.S. PATENT DOCUMENTS

| | | |
|---|---|---|
| 6,323,846 B1 | 11/2001 | Westerman et al. |
| 8,624,870 B2 | 1/2014 | Joharapurkar et al. |
| 8,860,432 B2 | 10/2014 | Shen et al. |
| 8,866,500 B2 | 10/2014 | Kremin et al. |
| 8,884,917 B2 | 11/2014 | Seo |
| 8,982,097 B1 | 3/2015 | Kuzo et al. |
| 2012/0217978 A1* | 8/2012 | Shen ..................... G06F 3/0418 324/601 |

(Continued)

*Primary Examiner* — Insa Sadio
(74) *Attorney, Agent, or Firm* — Sughrue Mion, PLLC

(57) ABSTRACT

A touch screen controller is provided. The touch screen controller includes: an offset cancellation circuit configured to cancel offset capacitance of a touch screen panel including a first channel and a second channel crossing the first channel, the offset cancellation circuit connected to the touch screen panel through a sensing node; a charge amplifier configured to generate a sensing voltage from a sensing signal output from the touch screen panel, the charge amplifier including an amplifier having a first input terminal connected to the sensing node and a second input terminal to which an input voltage is applied; and a channel driver configured to provide a driving voltage, which is equal to or greater than the input voltage, to the second channel in a self capacitance sensing mode for the first channel.

19 Claims, 21 Drawing Sheets

(56) References Cited

U.S. PATENT DOCUMENTS

2014/0176489 A1 6/2014 Park
2014/0240280 A1 8/2014 Ekici et al.
2015/0002444 A1 1/2015 Brunet et al.

* cited by examiner

TOUCH SCREEN CONTROLLER, TOUCH SENSING DEVICE, AND TOUCH SENSING METHOD

CROSS-REFERENCE TO THE RELATED APPLICATIONS

This application claims priority from U.S. Provisional Application No. 62/182,721, filed on Jun. 22, 2015, in the United States Patents and Trademark Office, and Korean Patent Application No. 10-2016-0005316, filed on Jan. 15, 2016, in the Korean Intellectual Property Office, the disclosures of which are incorporated herein in their entireties by reference.

BACKGROUND

Apparatuses and methods consistent with the exemplary embodiments of the inventive concept relate to a touch sensing device, and more particularly, to a touch screen controller, a touch sensing device including the touch screen controller, and a touch sensing method.

A touch sensing device is a kind of input device configured to enable a user to transmit user inputs using a hand or an object, such as a touch pen, with respect to content displayed on a screen of a display device. The touch sensing device may be provided on a front surface of the display device and convert a position touched by the user's hand or the object, such as the touch pen, on the front surface of the touch sensing device, into an electric signal. Electronic devices in which a display device is installed, for example, a portable phone, a laptop computer, a desktop computer, and a personal digital assistant (PDA), may recognize the touched position based on the electric signal, analyze the touched position, and perform an operation corresponding to a user's touch input. A resistive method, a photosensitive method, and a capacitive method are known as methods in which touch sensing devices sense touches. In particular, a capacitive touch sensing device may convert a touch position into an electric signal based on a capacitance formed by a user's hand or an object, such as a touch pen, and a conductive electrode of the capacitive touch sensing device.

SUMMARY

According to an aspect of the inventive concept, there is provided a touch screen controller including: an offset cancellation circuit configured to cancel offset capacitance of a touch screen panel including a first channel and a second channel crossing the first channel, the offset cancellation circuit connected to the touch screen panel through a sensing node; a charge amplifier configured to generate a sensing voltage from a sensing signal output from the touch screen panel, the charge amplifier including an amplifier having a first input terminal connected to the sensing node and a second input terminal to which an input voltage is applied; and a channel driver configured to provide a driving voltage, which is equal to or greater than the input voltage, to the second channel in a self capacitance sensing mode for the first channel.

According to another aspect of the inventive concept, there is provided a touch sensing device including: a touch screen panel configured to sense a touch input, the touch screen panel including a first channel and a second channel crossing the first channel; and a touch screen controller configured to provide a driving voltage to the second channel in a self capacitance sensing mode for the first channel and sense a variation in an amount of capacitance of the first channel, caused by the touch input.

According to still another aspect of the inventive concept, there is provided a touch sensing device including: a touch screen panel configured to sense a touch or proximity input, and including: a first channel and a second channel crossing the first channel; and an offset self capacitor and an offset mutual capacitor configured to have offset self capacitance and offset mutual capacitance, respectively, when an input voltage is applied to the first channel; and a touch screen controller configured to sense a variation in an amount of capacitance of the first channel caused by the touch or proximity input, and generate a sensing voltage from a sensing signal output from the touch screen panel. Here, the touch screen controller includes an offset cancellation capacitor connected to the offset self capacitor and the offset mutual capacitor of the touch screen panel, and the offset mutual capacitor along with the offset cancellation capacitor are configured to cancel at least some of the offset self capacitance.

According to yet another aspect of the inventive concept, there is provided a touch sensing method of a touch screen panel including a first channel and a second channel crossing the first channel, the touch sensing method including: setting a voltage of a sensing node connected to the first channel to an input voltage in a self capacitance sensing mode for the first channel; applying a driving voltage, which is equal to or greater than the input voltage, to the second channel in the self capacitance sensing mode for the first channel; and generating a sensing voltage from a sensing signal of the sensing node depending on a variation in an amount of capacitance of the first channel, caused by a touch or proximity input.

BRIEF DESCRIPTION OF THE DRAWINGS

The exemplary embodiments of the inventive concept will be more clearly understood from the following detailed description taken in conjunction with the accompanying drawings, in which.

DETAILED DESCRIPTION OF THE EXEMPLARY EMBODIMENTS

Figure 1:
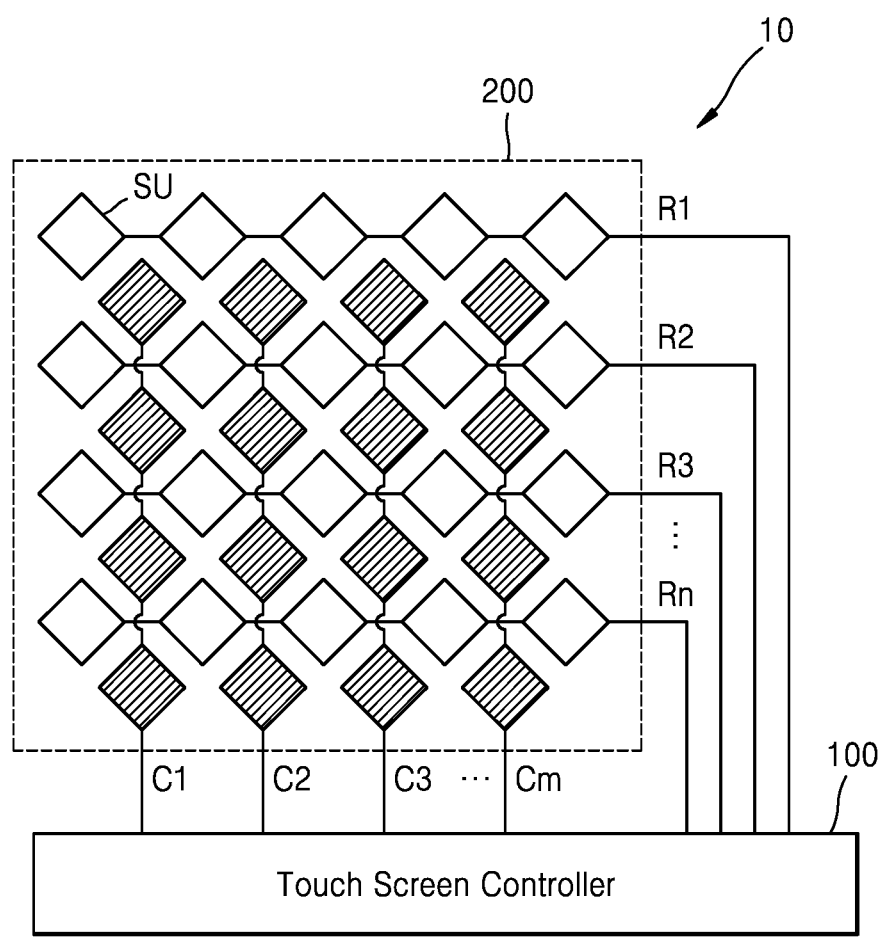
FIG. 1 is a block diagram of a touch sensing device according to an exemplary embodiment.

As used herein, the term "and/or" includes any and all combinations of one or more of the associated listed items. The inventive concept will now be described more fully hereinafter with reference to the accompanying drawings, in which exemplary embodiments of the inventive concept are shown. These embodiments are provided so that this disclosure will be thorough and complete and fully conveys the scope of the inventive concept to one skilled in the art. Accordingly, while the inventive concept can be modified in various ways and take on various alternative forms, specific embodiments thereof are shown in the drawings and described in detail below as examples. There is no intent to limit the inventive concept to the particular forms disclosed. On the contrary, the inventive concept is to cover all modifications, equivalents, and alternatives falling within the spirit and scope of the appended claims. Like reference numerals refer to like elements throughout. In the drawings, the thicknesses of layers and regions may be exaggerated for clarity.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. Thus, a first element, component, region, layer or section discussed below could be termed a second element, component, region, layer or section without departing from the teachings of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless explicitly so defined herein.

FIG. 1 is a block diagram of a touch sensing device 10, according to an exemplary embodiment.

Referring to FIG. 1, the touch sensing device 10 includes a touch screen controller 100 and a touch screen panel 200. The touch sensing device 10 may be an electronic device including an image display function. The touch sensing device 10 may be included in a personal computer (PC) or a mobile device, but is not limited thereto. The mobile device may be implemented as a laptop computer, a mobile phone, a smart phone, a tablet PC, a personal digital assistant (PDA), an enterprise digital assistant (EDA), a digital still camera, a digital video camera, a portable multimedia player (PMD), a personal navigation device or portable navigation device (PND), a handheld game console, a mobile internet device (MID), a wearable computer, an internet of things (IoT) device, an internet of everything (IoE) device, a drone, or an e-book, but is not limited.

The touch screen panel 200 may generate a sensing signal corresponding to a touch input, in response to the touch input, and may provide the generated sensing signal to the touch screen controller 100. The touch input includes not only a direct touch of a conductive object such as finger but also an approach of the conductive object to the touch screen panel 200. Hereinafter, a thing with which a user may apply a touch input to the touch screen panel 200 is defined as "object". For example, the object may be a conductive object, such as finger, a touch pen or a stylus pen, but is not limited thereto.

The touch screen panel 200 may include row channels R1 through Rn arranged in a first direction and column channels C1 through Cm arranged in a second direction crossing the first direction. For example, the first direction may be substantially perpendicular to the second direction. Each of the row channels R1 through Rn and the column channels C1 through Cm may include a plurality of sensing units SU that are electrically connected to one another in the first or second direction. In an exemplary embodiment, the plurality of row channels R1 through Rn and the plurality of column channels C1 through Cm may be formed in different layers. In an exemplary embodiment, the plurality of row channels R1 through Rn and the plurality of column channels C1 through Cm may be formed in the same layer.

In the current exemplary embodiment, the plurality of sensing units SU may be capacitive touch sensors, and thus, the touch screen panel 200 may be referred to as a capacitive touch screen panel. The touch screen panel 200 may generate a sensing signal by using a mutual capacitance sensing method or a self capacitance sensing method. The mutual capacitance sensing method and the self capacitance sensing method will be described in detail with reference to FIGS. 3A through 4B below.

The touch screen controller 100 may sense whether a touch input is generated in the touch screen panel 200 and a position where the touch input is applied. In the current exemplary embodiment, the touch screen controller 100 may sense a touch input by using the self capacitance sensing method. However, the inventive concept is not limited thereto. In some exemplary embodiments, the touch screen controller 100 may sense a touch input by using the self capacitance sensing method and the mutual capacitance sensing method. In an exemplary embodiment, the touch screen controller 100 may sense a touch input by alternately using the self capacitance sensing method and the mutual capacitance sensing method.

In a self capacitance sensing mode, the touch screen controller 100 may apply an input voltage signal for driving to a first channel, receive a sensing signal from the first channel, and detect whether a touch input is generated in the touch screen panel 200 and a position where the touch input is applied, based on the received sensing signal. The input voltage signal may be, for example, a voltage signal that swings based on a specific voltage, like a square wave. In the current specification, the first channel may denote a channel that is a target for self capacitance sensing.

In addition, in the self capacitance sensing mode, the touch screen controller 100 may provide a driving signal to a second channel crossing the first channel. The driving signal may be, for example, a voltage signal that swings based on a specific voltage, like a square wave. In the current specification, the second channel may denote a channel that is not a target for self capacitance sensing.

In an exemplary embodiment, the first channel may be one of the plurality of row channels R1 through Rn, and the second channel may be one of the plurality of column channels C1 through Cm. In an exemplary embodiment, the first channel may be one of the plurality of column channels C1 through Cm, and the second channel may be one of the plurality of row channels R1 through Rn.

Also, the touch screen controller 100 may cancel offset capacitance from a sensing signal received from the touch screen panel 200. Accordingly, a dynamic range of the sensing signal may increase. The offset capacitance may denote parasitic capacitance generated by one or more sensing units SU. Even if a touch input is not applied to the touch screen panel 200, a sensing signal may be output due to offset capacitance.

Figure 2:
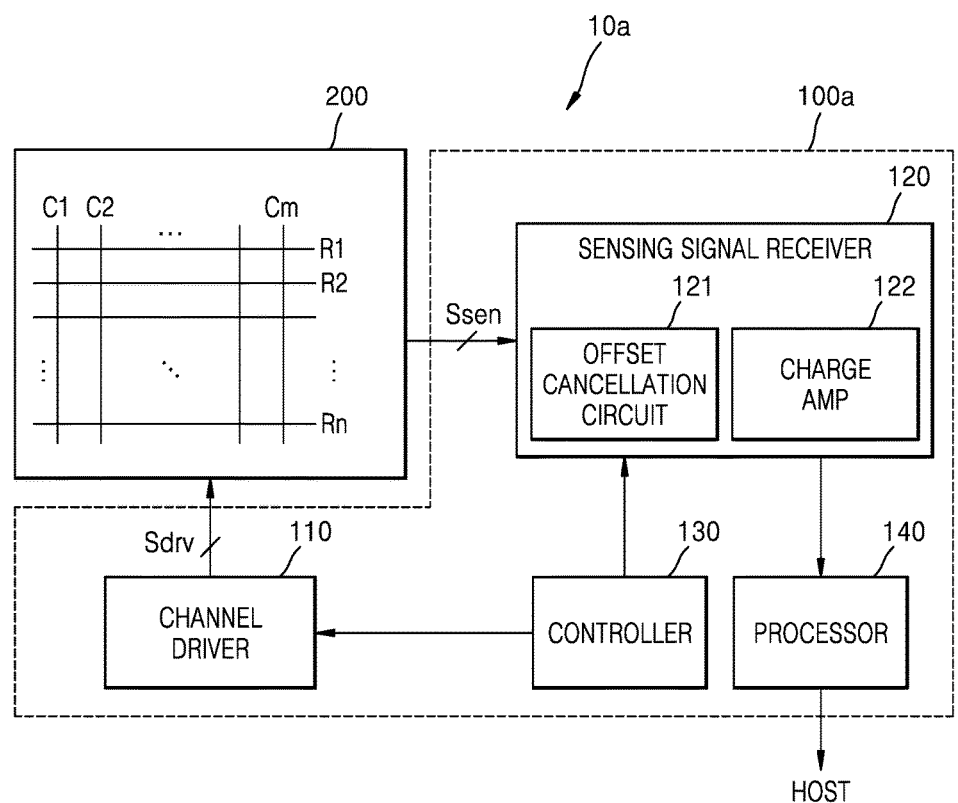
FIG. 2 is a detailed block diagram of a touch sensing device, according to an exemplary embodiment.

FIG. 2 is a detailed block diagram of a touch sensing device 10a, according to an exemplary embodiment.

Referring to FIG. 2, the touch sensing device 10a includes a touch screen controller 100a and a touch screen panel 200. The touch sensing device 10a may correspond to an implementation example of the touch sensing device 10 of FIG. 1, and the touch screen panel 200 may correspond to the touch screen panel 100 of FIG. 1. Accordingly, details described with reference to FIG. 1 may be applied to the current exemplary embodiment, and repeated descriptions are omitted. Hereinafter, the touch screen controller 100a will be mainly described.

The touch screen controller 100a may include a channel driver 110, a sensing signal receiver 120, a controller 130, and a processor 140. In the current exemplary embodiment, the touch screen controller 100a may sense a touch input by using the self capacitance sensing method. The touch screen controller 100a may detect a touch input by sensing a sensing signal Ssen corresponding to a variation in an amount of capacitance of a first channel, which is caused by a touch input. The first channel may be a channel that is sensed in a self capacitance sensing mode. For example, the first channel may be one of row channels R1 through Rn. However, the inventive concept is not limited thereto, and the first channel may be one of column channels C1 through Cm.

The channel driver 110 may provide a driving signal Sdrv to a second channel crossing the first channel. The second channel may be a channel that is not sensed in the self capacitance sensing mode. When the first channel is one of the row channels R1 through Rn, the second channel may be one of the column channels C1 through Cm. When the first channel is one of the column channels C1 through Cm, the second channel may be one of the row channels R1 through Rn. The number of driving signals Sdrv may be determined depending on the number of second channels formed in the touch screen panel 200. In an exemplary embodiment, a plurality of driving signals Sdrv may be sequentially applied to second channels corresponding thereto.

The sensing signal receiver 120 may receive the sensing signal Ssen from the first channel. In the current exemplary embodiment, when the self capacitance sensing method is used, the sensing signal receiver 120 may apply an input signal to the first channel and receive the sensing signal Ssen from the first channel. In other words, in the self capacitance sensing mode, the sensing signal receiver 120 may serve as both a driver and a receiver. When a mutual capacitance sensing method is used, the sensing signal receiver 120 may only receive the sensing signal Ssen from the first channel without applying an input signal to the first channel. In other words, in the mutual capacitance sensing mode, the sensing signal receiver 120 may serve only as receiver.

In the current exemplary embodiment, the sensing signal receiver 120 may include an offset cancellation circuit 121 and a charge amplifier 122. The offset cancellation circuit 121 may cancel offset capacitance from the sensing signal Ssen. The charge amplifier 122 may generate a sensing voltage from the sensing signal Ssen. A detailed operation of the sensing signal receiver 120 will be described with reference to FIG. 7 below.

The controller 130 may control the channel driver 110 and the sensing signal receiver 120. The controller 130 may determine a frequency or amplitude of the driving signal Sdrv, and may provide a control signal, which depends on the determined frequency or amplitude, to the channel driver 110. Also, the controller 130 may determine a frequency or amplitude of each of voltages that are applied to the offset cancellation circuit 121 and the charge amplifier 122, and may provide a control signal, which depends on the determined frequency or amplitude, to the sensing signal receiver 120.

The processor 140 may calculate touch coordinates based on touch data that is received from the sensing signal receiver 120, and may provide the calculated touch coordinates to a host HOST. The processor 140 may calculate touch coordinates by using various algorithms. In an exemplary embodiment, the processor 140 may calculate touch coordinates depending on a single touch input. In an exemplary embodiment, the processor 140 may calculate touch coordinates depending on a multi-touch input.

Figure 3A:
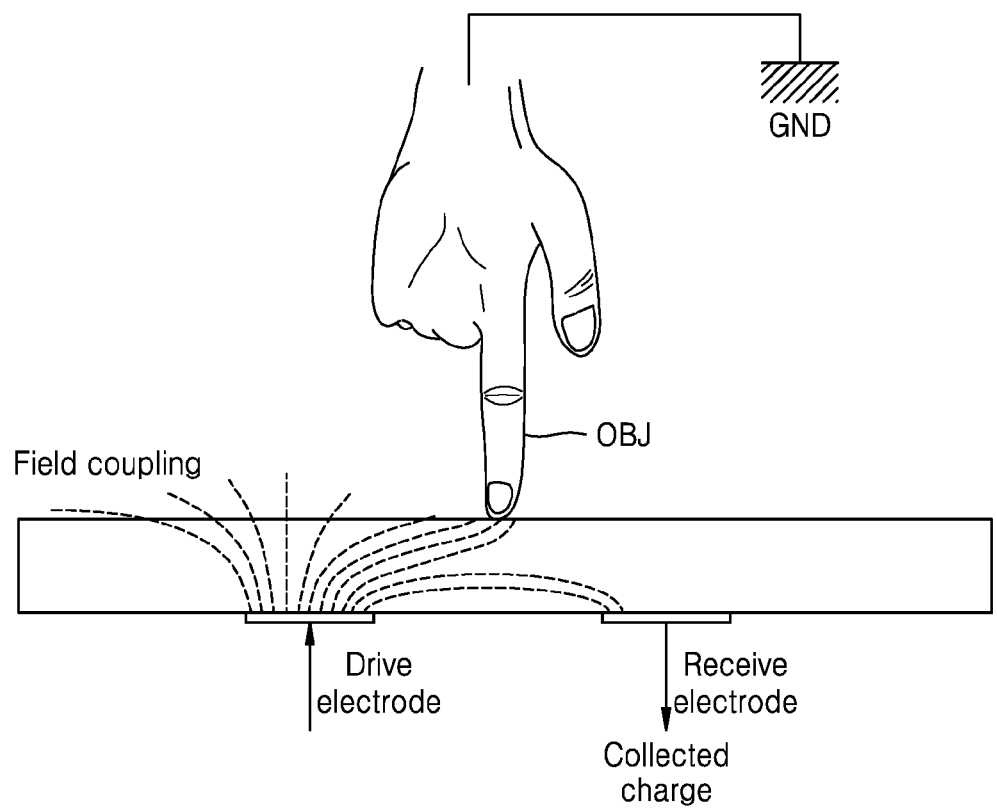
FIG. 3A is a diagram for explaining a variation in capacitance due to a touch input in a mutual capacitance sensing mode, according to an exemplary embodiment.

FIG. 3A is a diagram for explaining a variation in capacitance due to a touch input in a mutual capacitance sensing mode.

Referring to FIG. 3A, in the mutual capacitance sensing mode, a predetermined voltage pulse is applied to a drive electrode, and charges corresponding to the voltage pulse are collected in a receive electrode (or referred to as a sensing electrode). When an object OBJ is placed between the drive electrode and the receive electrode, an electrical field indicated by a dotted line is changed, and a variation in the intensity of the electrical field causes a variation in capacitance.

In this manner, capacitance may vary through a variation in an electric field between the drive electrode and the receive electrode, and thus, a touch input may be sensed through a variation in the capacitance. Although FIG. 3A illustrates a contact touch, a variation in an electrical field may also be caused by a proximity sensing. Also, although FIG. 3A illustrates a case in which an object OBJ is a finger, a variation in an electrical field may also be caused by touches via other conductors such as a touch pen.

Referring to FIGS. 1 and 3A, in an exemplary embodiment, the row channels R1 through Rn of FIG. 1 may be driving channels, and the column channels C1 through Cm of FIG. 1 may be sensing channels. The driving channels may include a plurality of drive electrodes that are electrically connected to one another, and the sensing channels may include a plurality of sensing electrodes that are electrically connected to one another. The drive electrodes and the sensing electrodes may be referred to as sensing units. A capacitor may be formed between each drive electrode and each sensing electrode, and capacitance of the capacitor may be changed according to a touch input. The capacitance of the capacitor that is formed between each drive electrode and each sensing electrode may be referred to as mutual capacitance.

Figure 3B:
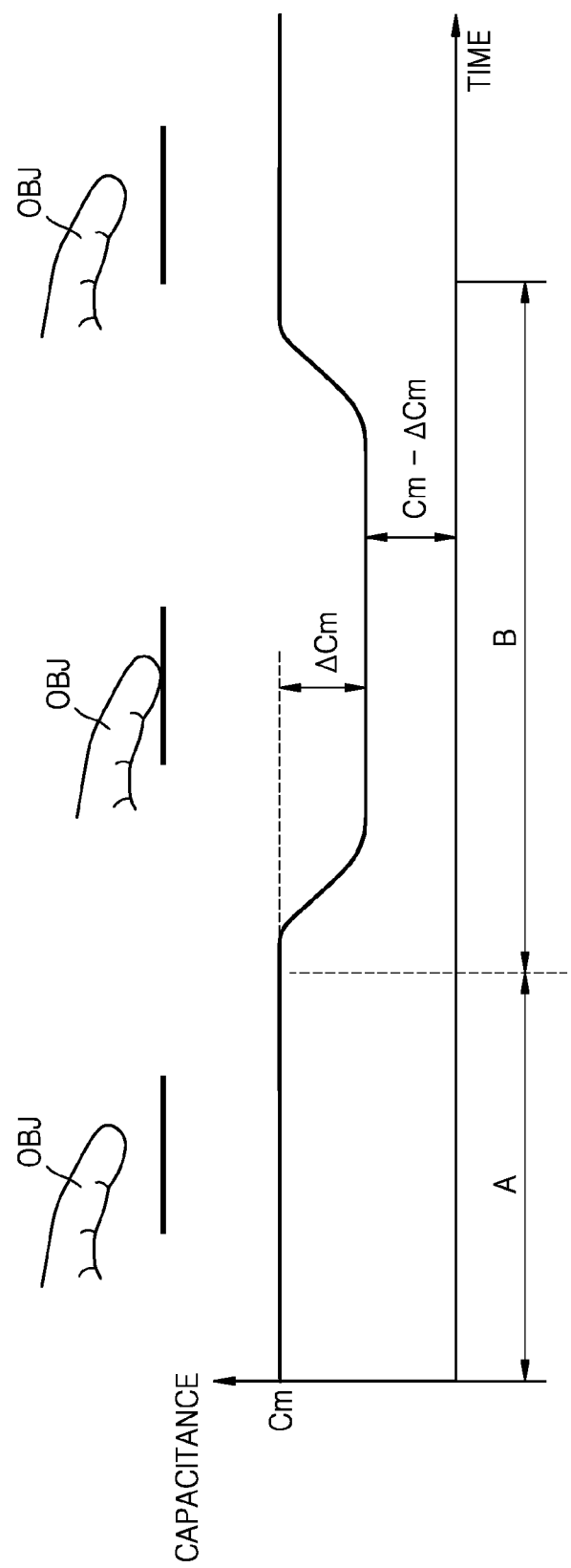
FIG. 3B is a graph showing an ideal variation in an amount of capacitance due to a touch input in a mutual capacitance sensing mode, according to an exemplary embodiment.

FIG. 3B is a graph showing an ideal variation in an amount of capacitance due to a touch input in a mutual capacitance sensing mode.

Referring to FIG. 3B, an X axis denotes time and a Y axis denotes capacitance. Each sensing unit (for example, the sensing unit SU of FIG. 1) may basically have offset mutual capacitance Cm corresponding to a parasitic component, and capacitance of the sensing unit may vary due to an approach or contact of an object OBJ. A period A is a period in which the object OBJ does not contact a sensing unit for touch sensing or is not close enough to the sensing unit for proximity sensing, and in this case, capacitance of the sensing unit may correspond to the offset mutual capacitance Cm. For example, the offset mutual capacitance Cm may be several picofarads (pF).

A period B is a period in which the object OBJ contacts the sensing unit, and in this case, signal capacitance of the sensing unit may correspond to a value (that is, Cm−ΔCm) obtained by subtracting a mutual capacitance variation ΔCm caused by the object OBJ from the offset mutual capacitance Cm. For example, the signal capacitance in the period B may be several tens of femtofarads (fF).

Figure 4A:
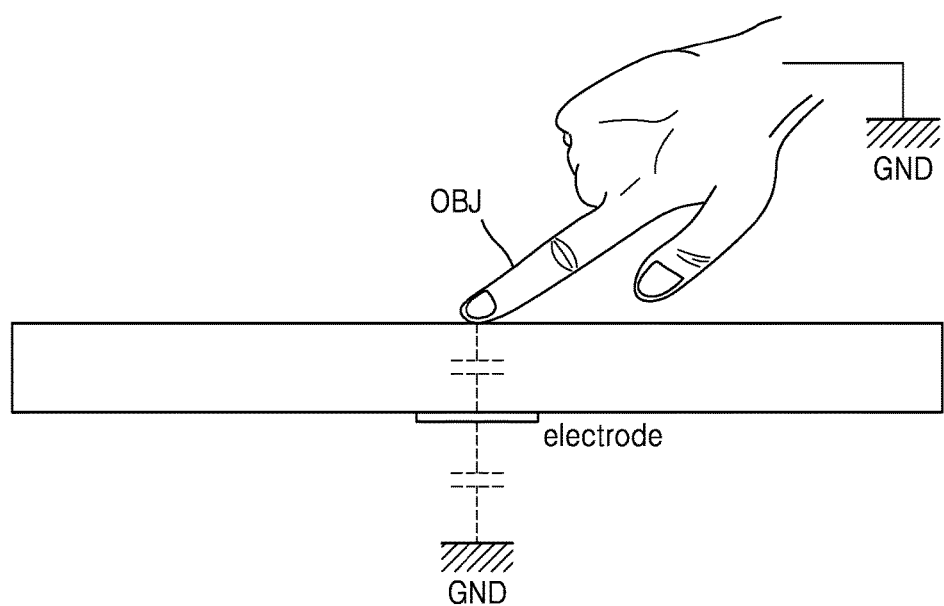
FIG. 4A is a diagram for explaining a variation in capacitance due to a touch input in a self capacitance sensing mode, according to an exemplary embodiment.

FIG. 4A is a diagram for explaining a variation in capacitance due to a touch input in a self capacitance sensing mode.

Referring to FIG. 4A, in the self capacitance sensing mode, a predetermined voltage pulse is applied to an electrode, and a voltage or charges corresponding to the voltage pulse are collected from the electrode. The electrode forms a capacitor with respect to a surrounding conductor (for example, a ground node). When an object OBJ contacts or approaches the electrode, capacitance of the capacitor may increase. In this manner, a variation in the capacitance may be sensed through the electrode, and a touch may be sensed through the sensed variation.

Referring to FIGS. 1 and 4A, in an exemplary embodiment, each of the row channels R1 through Rn and the column channels C1 through Cm of FIG. 1 may serve as both a driving channel and a sensing channel. Each of electrodes included in the row channels R1 through Rn and the column channels C1 through Cm may form a capacitor (for example, a floating capacitor) with respect to a surrounding conductive object, and capacitance of the capacitor may be changed in response to a touch input. The capacitance of a capacitor that is formed between the electrodes included in the row channels R1 through Rn and the column channels C1 through Cm and a surrounding conductive object may be referred to as self capacitance.

Figure 4B:
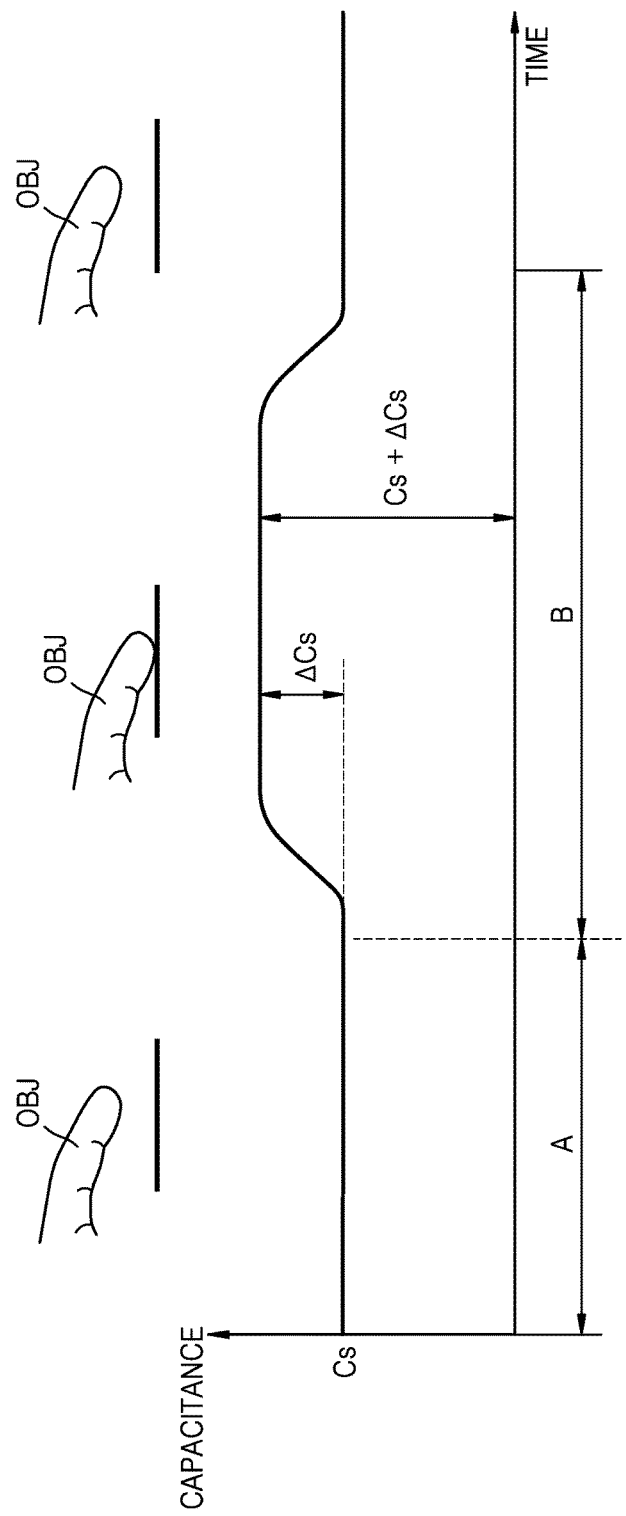
FIG. 4B is a graph showing an ideal variation in an amount of capacitance due to a touch input in a self capacitance sensing mode, according to an exemplary embodiment.

FIG. 4B is a graph showing an ideal variation in an amount of capacitance due to a touch input in a self capacitance sensing mode.

Referring to FIG. 4B, an X axis denotes time and a Y axis denotes capacitance. Each sensing unit (for example, the sensing unit SU of FIG. 1) may basically have offset self capacitance Cs corresponding to a parasitic component, and capacitance of the sensing unit may vary due to an approach or contact of an object OBJ. A period A is a period in which the object OBJ does not contact a sensing unit for touch sensing or is not close enough to the sensing unit for proximity sensing, and in this case, capacitance of the sensing unit may correspond to the offset self capacitance Cs. For example, the offset self capacitance Cs may be several tens of pF. The offset self capacitance Cs may be greater than the offset mutual capacitance Cm.

A period B is a period in which the object OBJ contacts the sensing unit, and in this case, signal capacitance of the sensing unit may correspond to a value (that is, Cs+ΔCs) obtained by adding a self capacitance variation ΔCs caused by the object OBJ to the offset self capacitance Cs. For example, the signal capacitance in the period B may be several tens of fF. In the self capacitance sensing mode, the offset self capacitance Cs may have a relatively large value compared to the signal capacitance. Accordingly, when offset capacitance is not cancelled, the signal capacitance may not be properly sensed, and thus, the offset capacitance may have a large influence on the sensitivity of a capacitive touch screen.

Figure 5:
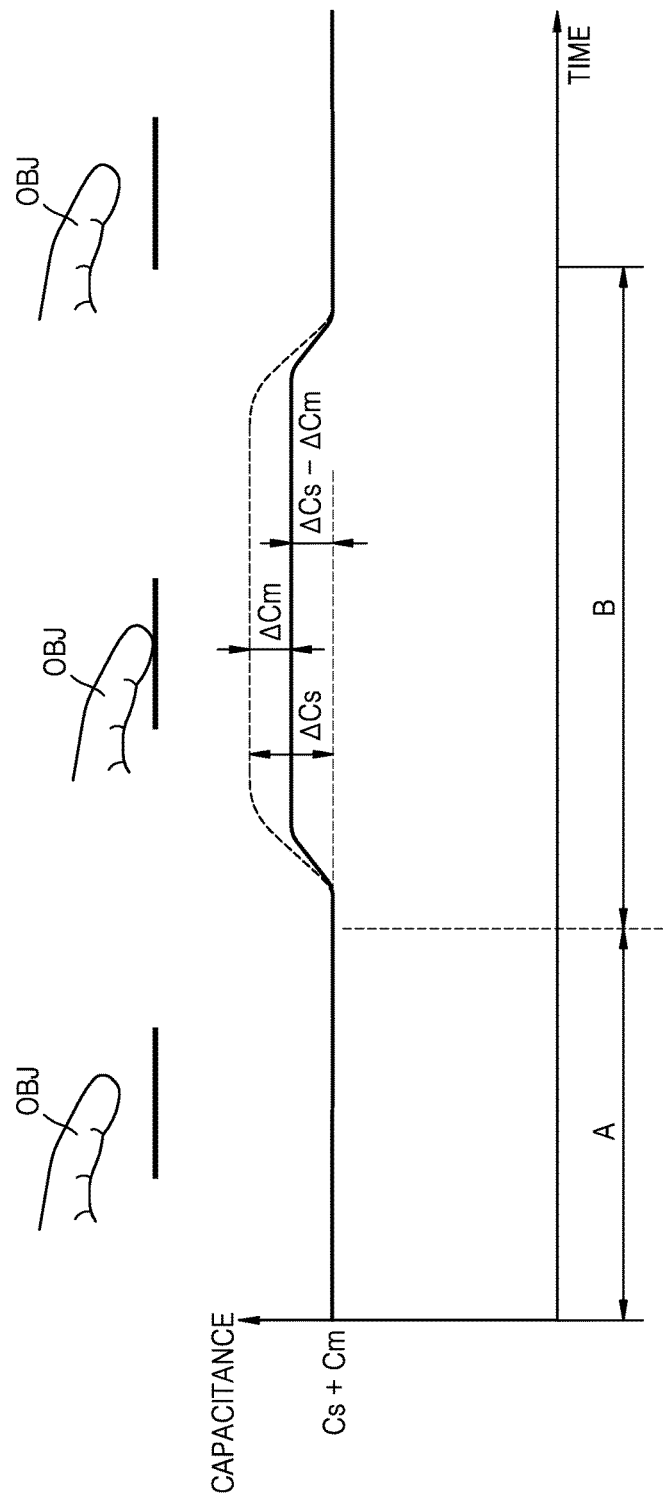
FIG. 5 is a graph showing an actual variation in an amount of capacitance, according to offset mutual capacitance, in a self capacitance sensing mode, according to an exemplary embodiment.

FIG. 5 is a graph showing an actual variation in an amount of capacitance, according to offset mutual capacitance, in a self capacitance sensing mode.

Referring to FIG. 5, an X axis denotes time and a Y axis denotes capacitance. In a self capacitance sensing mode for sensing a variation in an amount of self capacitance for a first channel, a ground voltage may be applied to a second channel crossing the first channel. Capacitance in a period A, in which an object OBJ does not contact an electrode for touch sensing or is not close enough to the electrode for proximity sensing, may correspond to the sum (Cs+Cm) of offset self capacitance Cs and offset mutual capacitance Cm. The capacitance in the period A of FIG. 5 is greater than the capacitance in the period A of FIG. 4B by the offset mutual capacitance Cm between the second channel connected to the ground voltage and the first channel.

A variation in an amount of capacitance in a period B in which the object OBJ contacts the electrode corresponds to a difference (that is, ΔCs−ΔCm) between a variation (ΔCs) in an amount of self capacitance and a variation (ΔCm) in an amount of mutual capacitance. The capacitance in the period B of FIG. 5 is less than the capacitance in the period B of FIG. 4B by the variation (ΔCm) in an amount of the mutual capacitance, and thus, a touch sensitivity is lowered.

Figure 6A:
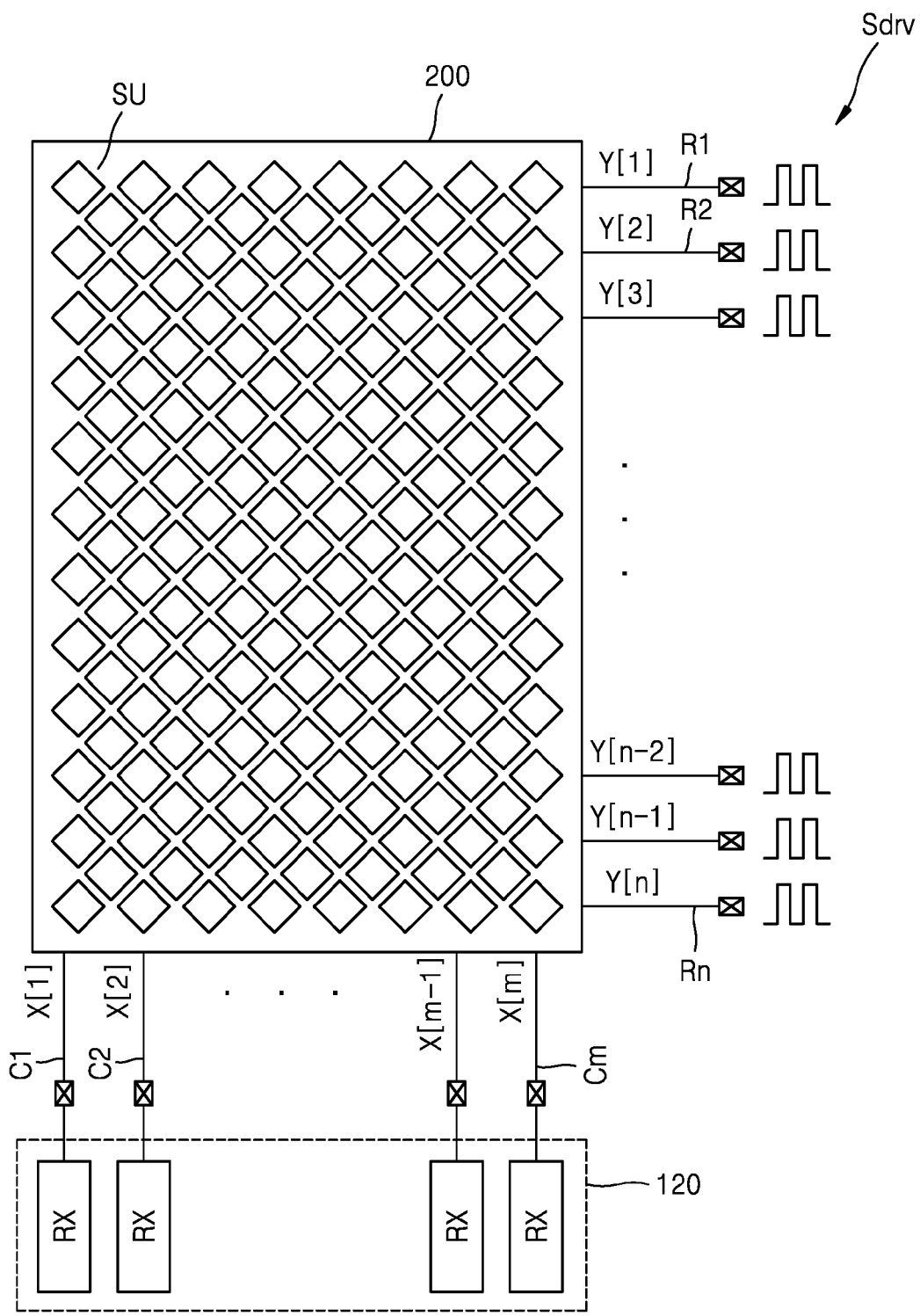
FIGS. 6A and 6B are diagrams illustrating driving schemes of a touch screen panel in a self capacitance sensing mode, according to exemplary embodiments.
Figure 6B:
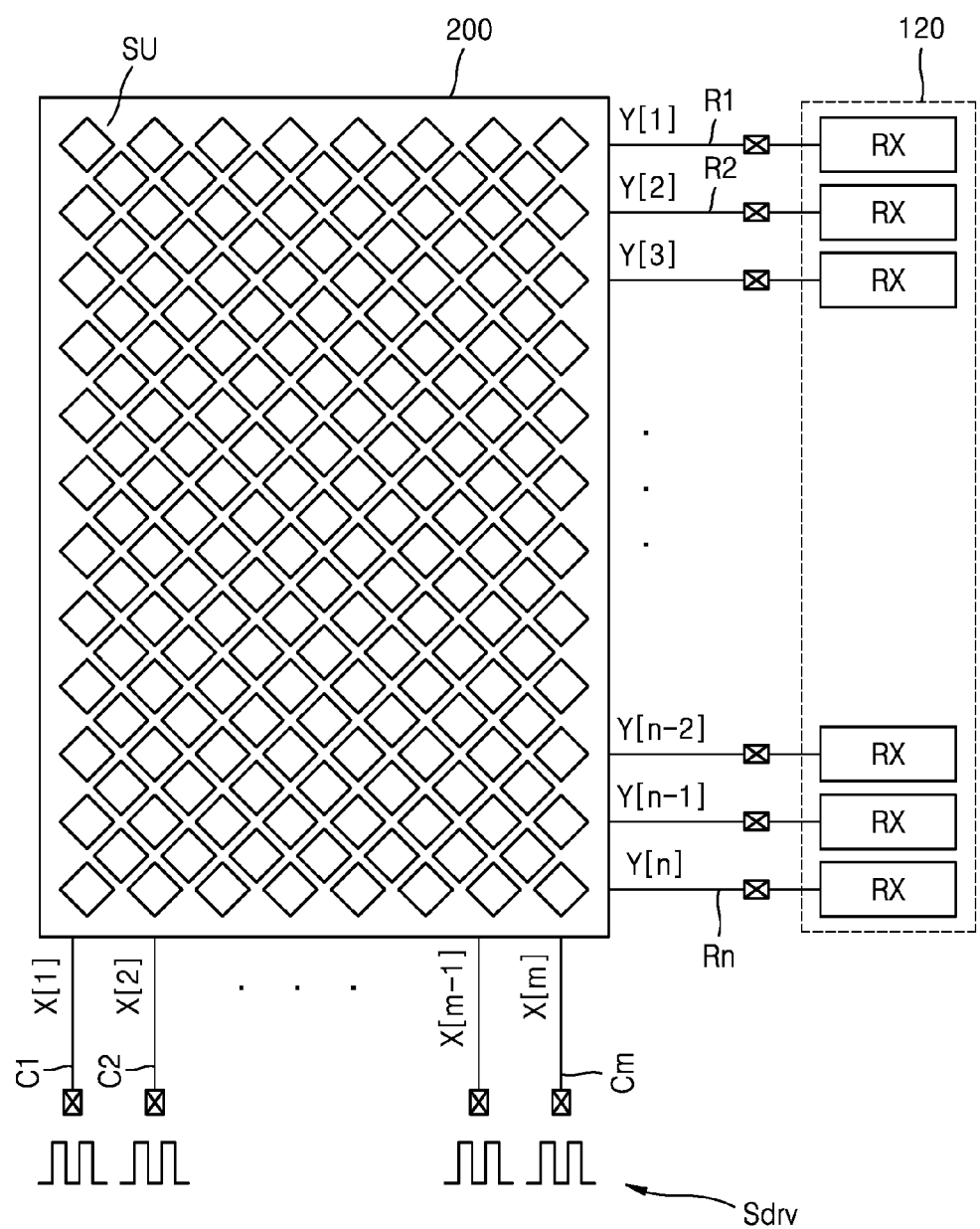

FIGS. 6A and 6B are diagrams illustrating driving schemes of a touch screen panel 200 in a self capacitance sensing mode, according to exemplary embodiments.

Referring to FIG. 6A, in a self capacitance sensing mode for first through m-th column channels C1 through Cm, a sensing signal receiver 120 may be connected to the first through m-th column channels C1 through Cm. The sensing signal receiver 120 may include a plurality of receivers RX connected to the first through m-th columns C1 through Cm, respectively. The plurality of receivers RX connected to the first through m-th columns C1 through Cm, respectively, may receive first through m-th sensing signals X[1] through X[m], respectively.

In the self capacitance sensing mode for the column channels C1 through Cm, a driving signal Sdrv may be applied to first through n-th row channels R1 through Rn. First through n-th driving signals Y[1] through Y[n] may be applied to the first through n-th row channels R1 through Rn, respectively. In an exemplary embodiment, the driving signal Sdrv may be provided as a driving voltage implemented in the form of a square wave.

Referring to FIG. 6B, in a self capacitance sensing mode for the first through n-th row channels R1 through Rn, the sensing signal receiver 120 may be connected to the first through n-th row channels R1 through Rn. The sensing signal receiver 120 may include a plurality of receivers RX connected to the first through n-th row channels R1 through Rn, respectively. The plurality of receivers RX connected to the first through n-th row channels R1 through Rn, respectively, may receive first through n-th sensing signals Y[1] through Y[n], respectively.

In the self capacitance sensing mode for the first through n-th row channels R1 through Rn, a driving signal Sdrv may be applied to the first through m-th column channels C1 through Cm. First through m-th driving signals X[1] through X[m] may be applied to the first through m-th column channels C1 through Cm, respectively. In an exemplary embodiment, the driving signal Sdrv may be provided as a driving voltage implemented in the form of a square wave.

Figure 7:
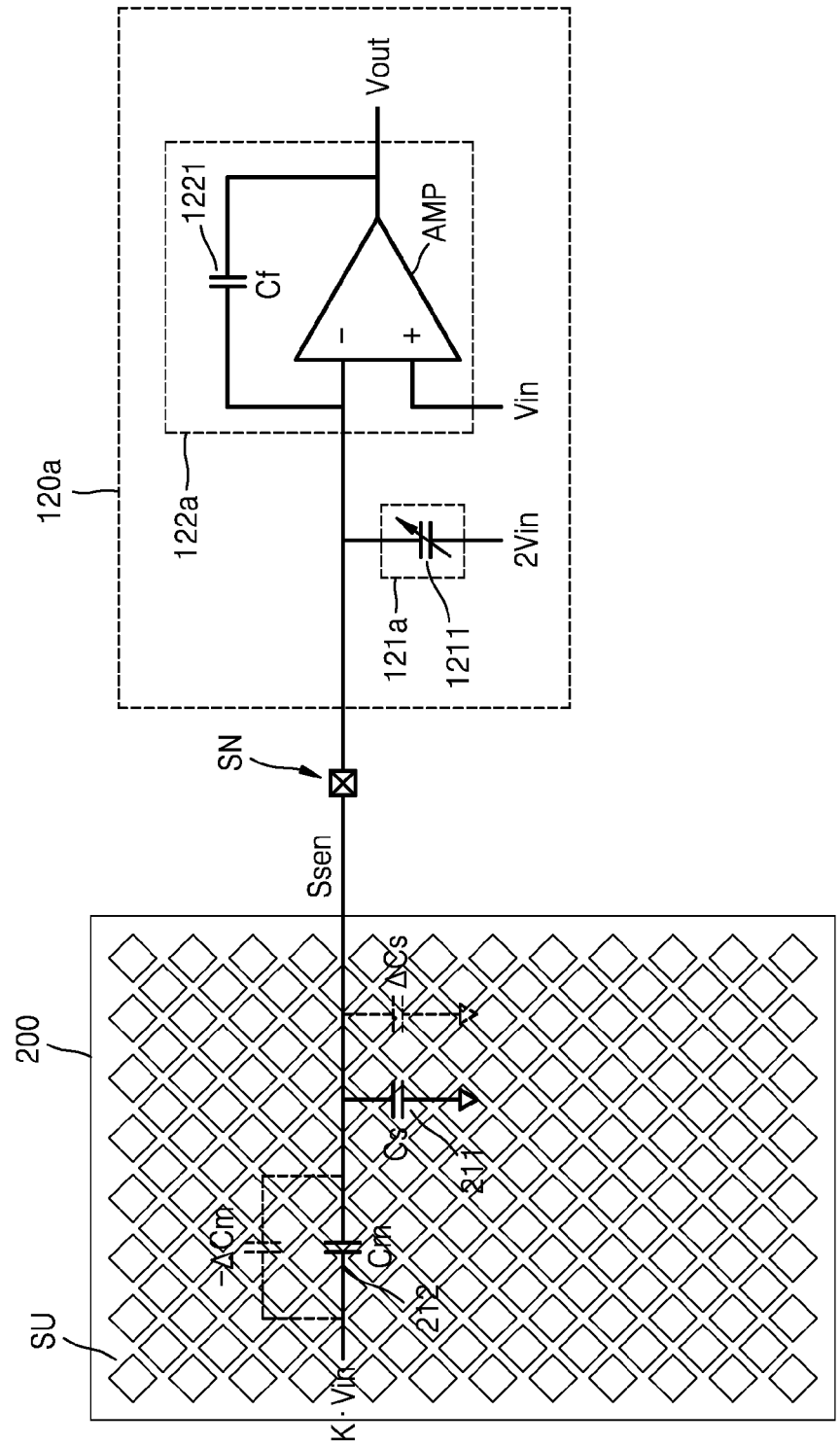
FIG. 7 is a detailed circuit diagram of a sensing signal receiver according to an exemplary embodiment.

FIG. 7 is a detailed circuit diagram of a sensing signal receiver 120a according to an exemplary embodiment.

Referring to FIG. 7, the sensing signal receiver 120a may include an offset cancellation circuit 121a and a charge amplifier 122a. The sensing signal receiver 120a may receive a sensing signal Ssen from a touch screen panel 200 through a sensing node SN. The sensing signal Ssen may be a signal that is received through the sensing node SN in a self capacitance sensing mode for a first channel. For example, the sensing signal receiver 120a shown in FIG. 7 may correspond to an example of the receiver RX included in the sensing signal receiver 120 of FIG. 6B.

The charge amplifier 122a may be connected to the sensing node SN and generate a sensing voltage Vout based on the sensing signal Ssen. In an exemplary embodiment, the charge amplifier 122a may convert the sensing signal Ssen, which is a current signal output from the touch screen panel 200, into the sensing voltage Vout which is a voltage signal. Accordingly, the charge amplifier 122a may be referred to as a Q-V converter or a capacitance-voltage converter.

Figure 8A:
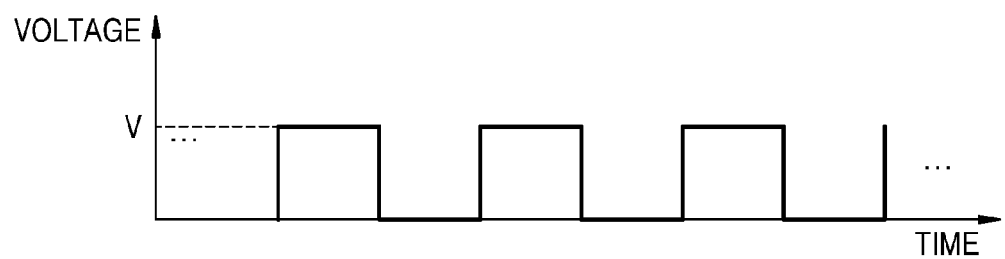
FIG. 8A is a graph showing an example of an input voltage that is applied to a charge amplifier of FIG. 7.

In the current exemplary embodiment, the charge amplifier 122a may include an amplifier AMP and a feedback capacitor Cf. The amplifier AMP may have a first input terminal (hereinafter, referred to as 'inverting input terminal') connected to the sensing node SN, a second input terminal (hereinafter, referred to as 'non-inverting input terminal') receiving an input voltage Vin, and an output terminal outputting the sensing voltage Vout. In an exemplary embodiment, the input terminal Vin that is applied to the non-inverting input terminal of the amplifier AMP may have the form of a square wave. For example, the input voltage Vin may be implemented as shown in FIG. 8A. The feedback capacitor Cf may be connected between the non-inverting input terminal of the amplifier AMP and the output terminal of the amplifier AMP.

In some exemplary embodiments, the charge amplifier 122a may further include a switch connected in parallel with the feedback capacitor Cf, and the switch may be turned on or off by a controller (for example, the controller 130 of FIG. 2). In this case, the switch may discharge the feedback capacitor Cf. In some exemplary embodiments, the charge amplifier 122a may further include a resistor connected in parallel with the feedback capacitor Cf.

Figure 8B:
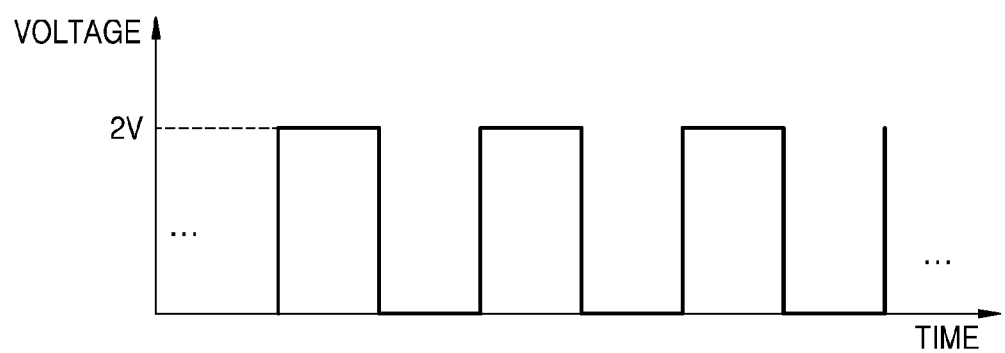
FIG. 8B is a graph showing an example of an offset cancellation voltage that is applied to an offset cancellation circuit of FIG. 7.

The offset cancellation circuit 121a may be connected to the sensing node SN and be configured to cancel the offset capacitance of the touch screen panel 200. In the current exemplary embodiment, the offset cancellation circuit 121a may include an offset cancellation capacitor 1211, and the offset cancellation capacitor 1211 may have a first terminal connected to the sensing node SN and a second terminal to which an offset cancellation voltage is applied. In the current exemplary embodiment, the offset cancellation voltage may be higher than the input voltage Vin that is applied to the non-inverting input terminal of the amplifier AMP. In an exemplary embodiment, the offset cancellation voltage may correspond to twice the input voltage Vin, that is, 2Vin. Hereinafter, an example in which the offset cancellation voltage is 2Vin will be described in detail. For example, the offset cancellation voltage may be implemented as shown in FIG. 8B.

According to a virtual short principle of the amplifier AMP, a voltage level of the inverting input terminal of the amplifier AMP is substantially the same as that of the non-inverting input terminal of the amplifier AMP. Accordingly, the voltage level of the non-inverting input terminal of the amplifier AMP may correspond to the input voltage Vin, and thus, a voltage level of the sensing node SN may correspond to the input voltage Vin.

Figure 8C:
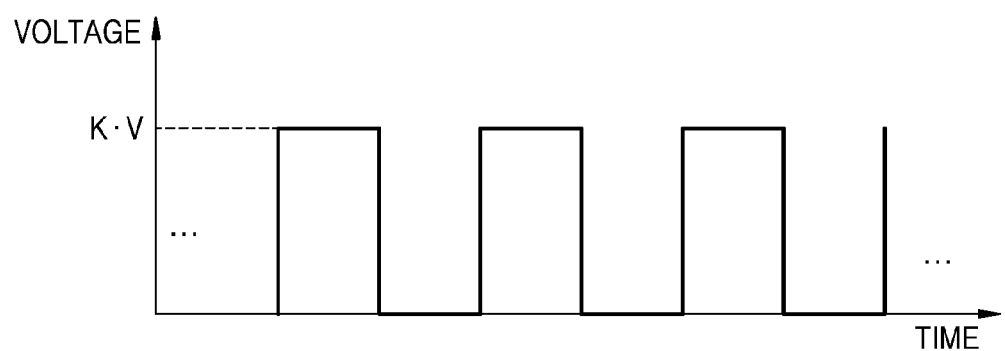
FIG. 8C is a graph showing an example of a driving voltage that is applied to a touch screen panel of FIG. 7.

In the current exemplary embodiment, in the self capacitance sensing mode for the first channel, a driving voltage may be applied to a second channel that is not sensed, and the driving voltage may be equal to or greater than the input voltage Vin. In an exemplary embodiment, the driving voltage may correspond to k times the input voltage Vin, that is, k*Vin (where k is an integer that is equal to or greater than 1). For example, the driving voltage may be implemented as shown in FIG. 8C. For example, k may be 1 and the driving voltage may be equal to the input voltage Vin. As another example, k may be 2 and the driving voltage may be twice the input voltage Vin, that is, 2Vin.

FIG. 8A is a graph showing an example of the input voltage Vin that is applied to the charge amplifier 122a of FIG. 7. Referring to FIG. 8A, an X axis denotes time, and a Y axis denotes a voltage level. The input voltage Vin may be provided as the form of a square wave having an amplitude of V.

FIG. 8B is a graph showing an example of an offset cancellation voltage that is applied to the offset cancellation circuit 121a of FIG. 7. Referring to FIG. 8B, an X axis denotes time, and a Y axis denotes a voltage level. The offset cancellation voltage may be provided as the form of a square wave having an amplitude of 2V, and the offset cancellation voltage may correspond to twice the input voltage Vin, that is, 2Vin.

FIG. 8C is a graph showing an example of a driving voltage that is applied to the touch screen panel 200 of FIG. 7. Referring to FIG. 8C, an X axis denotes time, and a Y axis denotes a voltage level. The driving voltage may be provided as the form of a square wave having an amplitude of k*V, and the driving voltage may correspond to k times the input voltage Vin, that is, k*Vin (where k is an integer that is equal to or greater than 1).

Figure 9A:
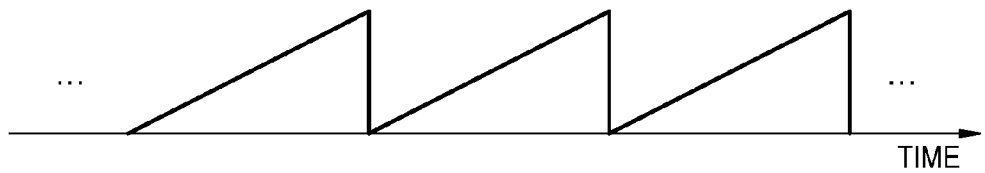
FIGS. 9A through 9C are graphs showing various examples of a driving voltage according to an exemplary embodiment.
Figure 9B:
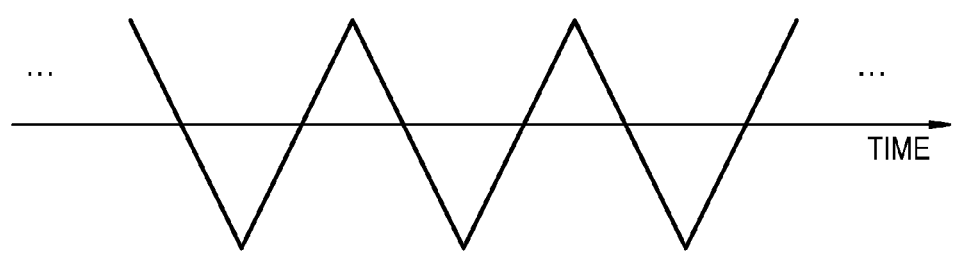
Figure 9C:
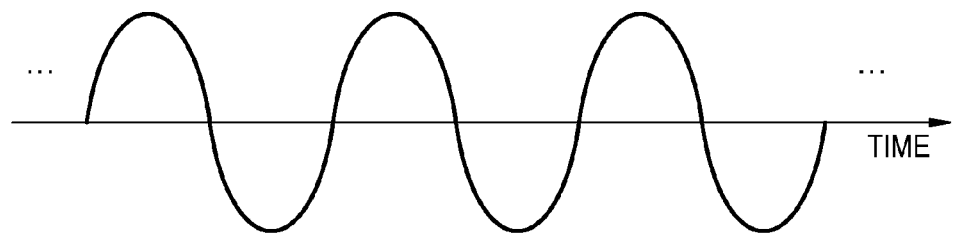

FIGS. 9A through 9C are graphs showing various examples of a driving voltage, according to an exemplary embodiment.

Referring to FIG. 9A, the driving voltage may be implemented as a ramp voltage. Referring to FIG. 9B, the driving voltage may be implemented as a chopping wave. Referring to FIG. 9C, the driving voltage may be implemented as a sine wave. In this manner, the driving voltage may be implemented in various forms. In an exemplary embodiment, the form of the driving voltage may have a form that is similar to that of the input voltage Vin that is applied to the charge amplifier 122a of FIG. 7, and the driving voltage may be equal to or greater than the input voltage Vin.

Figure 10:
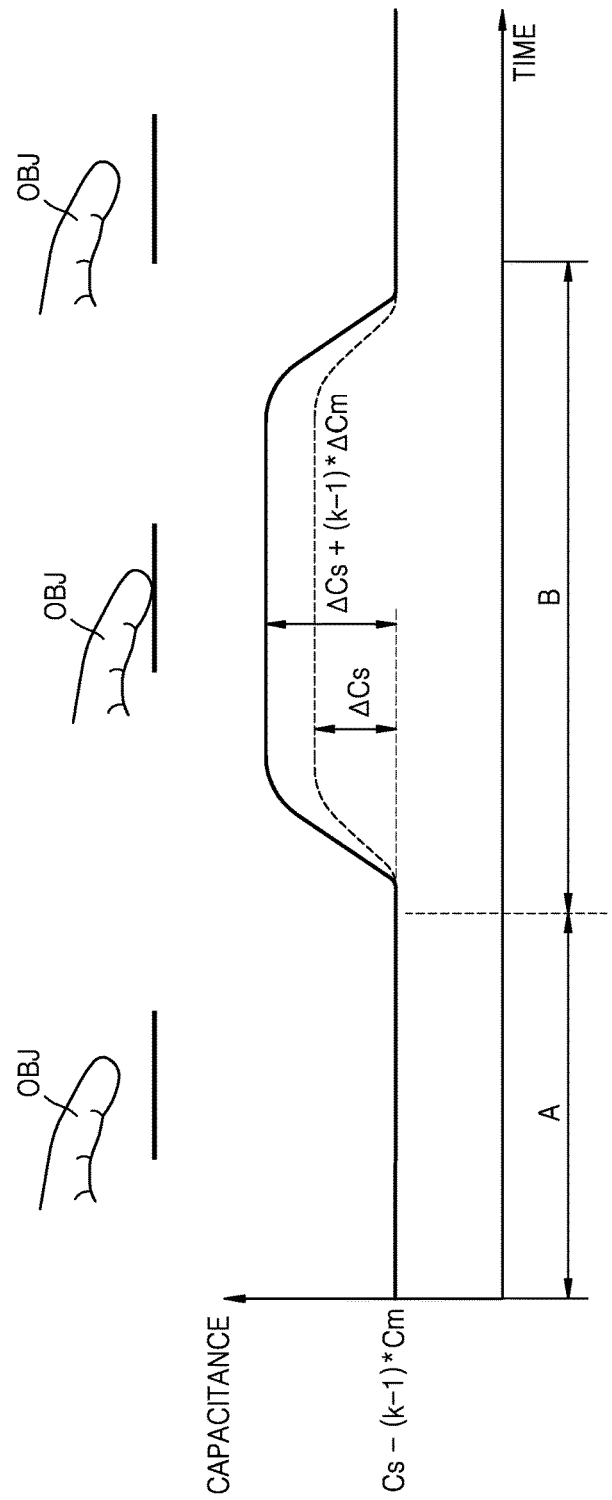
FIG. 10 is a graph showing a variation in an amount of capacitance in a self capacitance mode, according to an exemplary embodiment.

FIG. 10 is a graph showing a variation in an amount of capacitance in a self capacitance mode, according to an exemplary embodiment.

Referring to FIG. 10 along with FIG. 7, an X axis denotes time and a Y axis denotes capacitance. Cs denotes offset self capacitance of an offset self capacitor 211, and Cm denotes offset mutual capacitance of an offset mutual capacitor 212. ΔCs denotes a variation in an amount of self capacitance due to a touch input, and ΔCm denotes a variation in an amount of mutual capacitance due to a touch input. As described above with reference to FIGS. 3A and 3B, the mutual capacitance decreases by ΔCm due to a touch input. As described with above reference to FIGS. 4A and 4B, the self capacitance increases by ΔCs due to a touch input.

Hereinafter, a detailed operation of the sensing signal receiver 120a which is performed depending on a touch input will be described with reference to FIGS. 7 and 10. An operation of the sensing signal receiver 120a in a period A in which a touch input is not applied to a touch screen panel will be first explained, and then an operation of the sensing signal receiver 120a in a period B in which a touch input is applied to the touch screen panel will be explained.

In the period A in which a touch input is not applied to the touch screen panel, there is no variation in an amount of self capacitance, and is no variation in an amount of mutual capacitance (that is, ΔCs=ΔCm=0). In this case, since the voltage of the sensing node SN is the input voltage Vin, a voltage between both terminals of the offset self capacitor 211 is Vin, a voltage between both terminals of the offset mutual capacitor 212 is (Vin−k*Vin), and a voltage between both terminals of the offset cancellation capacitor 1211 is −Vin. Accordingly, electric charges Qs with which the offset self capacitor 211 is charged may correspond to Cs*Vin (that is, Qs=Cs*Vin), electric charges Qm with which the offset mutual capacitor 212 is charged may correspond to Cm*(Vin−k*Vin), and electric charges Qoff with which the offset cancellation capacitor 1211 is charged may correspond to Coff*(−Vin). Coff denotes offset cancellation capacitance of the offset cancellation capacitor 1211.

Since the sum of the electric charges Qs with which the offset self capacitor 211 is charged, the electric charges Qm with which the offset mutual capacitor 212 is charged, and the electric charges Qoff with which the offset cancellation capacitor 1211 is charged is 0 (that is, Qs+Qm+Qoff=0), the offset cancellation capacitance Coff of the offset cancellation capacitor 1211 may be represented by Equation 1.

$$Coff = Cs - (k-1)*Cm$$ [Equation 1]

In the current exemplary embodiment, since k is equal to or greater than 1, the offset cancellation capacitance Coff may be a value obtained by subtracting (k−1)*Cm from the offset self capacitance Cs. Accordingly, since the offset capacitance of the touch screen panel 200 is less than the offset capacitance (that is, Cs+Cm) of FIG. 5, the size of the offset cancellation capacitor 1211 may be reduced compared to the related art.

In this manner, according to the current exemplary embodiment, the offset mutual capacitance Cm may cancel some of the offset self capacitance Cs. In other words, since both the offset mutual capacitance Cm and the offset cancellation capacitance Coff serve to cancel at least some of the offset self capacitance Cs, the offset cancellation capacitance Coff decreases compared to the related art. Accordingly, the size of the offset cancellation circuit 121a may be reduced, and the size of a chip in which a touch screen controller (for example, the touch screen controller 100a of FIG. 2) including the offset cancellation circuit 121a is implemented may be reduced. As a result, a touch sensing device may be miniaturized.

In the period B in which a touch input is applied to the touch screen panel, the self capacitance increases by the variation ΔCs from the offset self capacitance Cs, and the mutual capacitance decreases by the variation ΔCm from the offset mutual capacitance Cm. In this case, since a driving voltage k*Vin is applied to the second channel, a variation ΔC in an amount of capacitance of the first channel may correspond to ΔCs+(k−1)*ΔCm. Accordingly, the sensing signal Ssen may be a current signal corresponding to ΔCs+(k−1)*ΔCm.

According to the current exemplary embodiment, the variation ΔC in an amount of capacitance of the first channel in the period B of FIG. 10 is greater than the variation in an amount of capacitance in the period B of FIG. 5. In this case, since the variation ΔCm in an amount of mutual capacitance serves to increase the capacitance of the first channel, the capacitance of the first channel increases compared to the related art when a touch is input, and thus, the sensitivity of the sensing signal Ssen may be improved.

Figure 11:
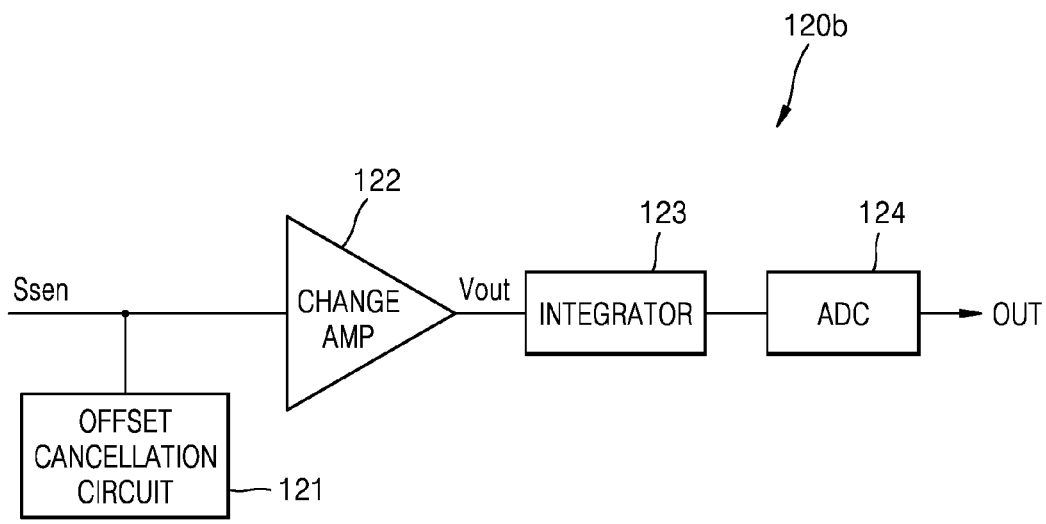
FIG. 11 is a block diagram of a sensing signal receiver according to an exemplary embodiment.

FIG. 11 is a block diagram of a sensing signal receiver 120b according to an exemplary embodiment.

Referring to FIG. 11, the sensing signal receiver 120b may include an offset cancellation circuit 121, a charge amplifier 122, an integrator 123, and an analog to digital converter (ADC) 124. The sensing signal receiver 120b according to the current exemplary embodiment is a modified embodiment of the sensing signal receiver 120 of FIG. 2, and may further include the integrator 123 and the ADC 124 compared to the sensing signal receiver 120 of FIG. 2. Details described above with reference to FIGS. 2 and 7 may be applied to the offset cancellation circuit 121 and the charge amplifier 122, and hereinafter, the integrator 123 and the ADC 124 will be mainly explained.

The integer 123 may integrate (or accumulate) a sensing voltage Vout that is output from the charge amplifier 122. For example, the integrator 123 may perform an integral operation at least two times according to the control of the controller 130 of FIG. 2. The ADC 124 may generate a digital output signal OUT by performing an analog to digital conversion operation on the output of the integrator 123. The digital output signal OUT may be provided to the processor 140 of FIG. 2, and the processor 140 may calculate touch coordinates based on the digital output signal OUT.

Figure 12:
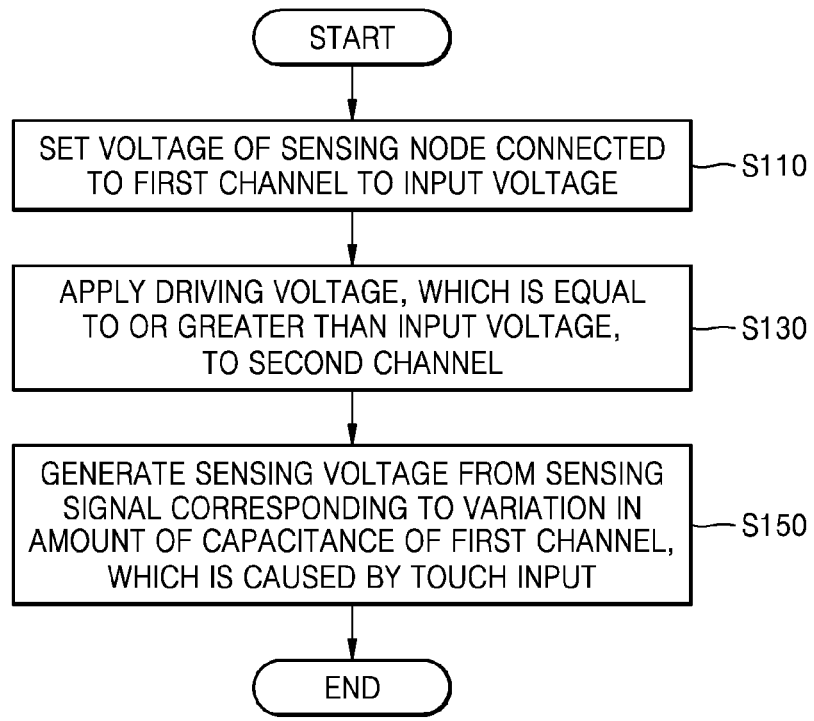
FIG. 12 is a flowchart illustrating a touch sensing method according to an exemplary embodiment.

FIG. 12 is a flowchart illustrating a touch sensing method according to an exemplary embodiment.

Referring to FIG. 12, the touch sensing method according to the current exemplary embodiment is an operation of sensing whether a touch input is applied to a touch screen panel and a position where the touch input is applied to the touch screen panel, according to a self capacitance sensing method. The touch sensing method according to the current exemplary embodiment may include operations that are performed in time series in the touch screen controller 100a of FIG. 2. Details described above with reference to FIGS. 1 through 11 may be applied to the current embodiment, and thus, repeated descriptions will be omitted.

In operation S110, the voltage of a sensing node connected to a first channel is set to an input voltage. The first channel is a channel that is a target for sensing in a self capacitance sensing mode. For example, the first channel may be one of the row channels R1 through Rn of FIG. 1. For example, in the sensing signal receiver 120a of FIG. 7, the inverting input terminal of the amplifier AMP may correspond to the input voltage Vin by applying the input voltage Vin to the non-inverting input terminal of the amplifier AMP, and thus, the voltage of the sensing node SN connected to the inverting input terminal may be set to the input voltage Vin. For example, the input voltage Vin may be implemented as a square wave.

In operation S130, a driving voltage that is equal to or greater than the input voltage is applied to a second channel. The second channel is a channel that is not a target for sensing in the self capacitance sensing mode, and may be a channel crossing the first channel. For example, the second channel may be one of the column channels C1 through Cm of FIG. 1. The channel driver 110 may apply a driving voltage corresponding to k times the input voltage Vin to the second channel, and k may be an integer that is equal to or greater than 1. In some exemplary embodiments, the operation S110 and the operation S130 may be substantially simultaneously performed. In some exemplary embodiments, the operation S110 may be performed after the operation S130.

In operation S150, a sensing voltage is generated from a sensing signal corresponding to a variation in an amount of capacitance of the first channel, which is caused by a touch input. For example, the level of the sensing signal Ssen may increase according to a variation $\Delta Cs$ in an amount of self capacitance of the first channel. For example, the sensing signal Ssen may be a current signal that depends on the variation $\Delta Cs$ in an amount of self capacitance of the first channel, and the feedback capacitor Cf may be charged by the sensing signal Ssen, and thus, the sensing signal Ssen may be converted into the sensing voltage Vout.

Figure 13:
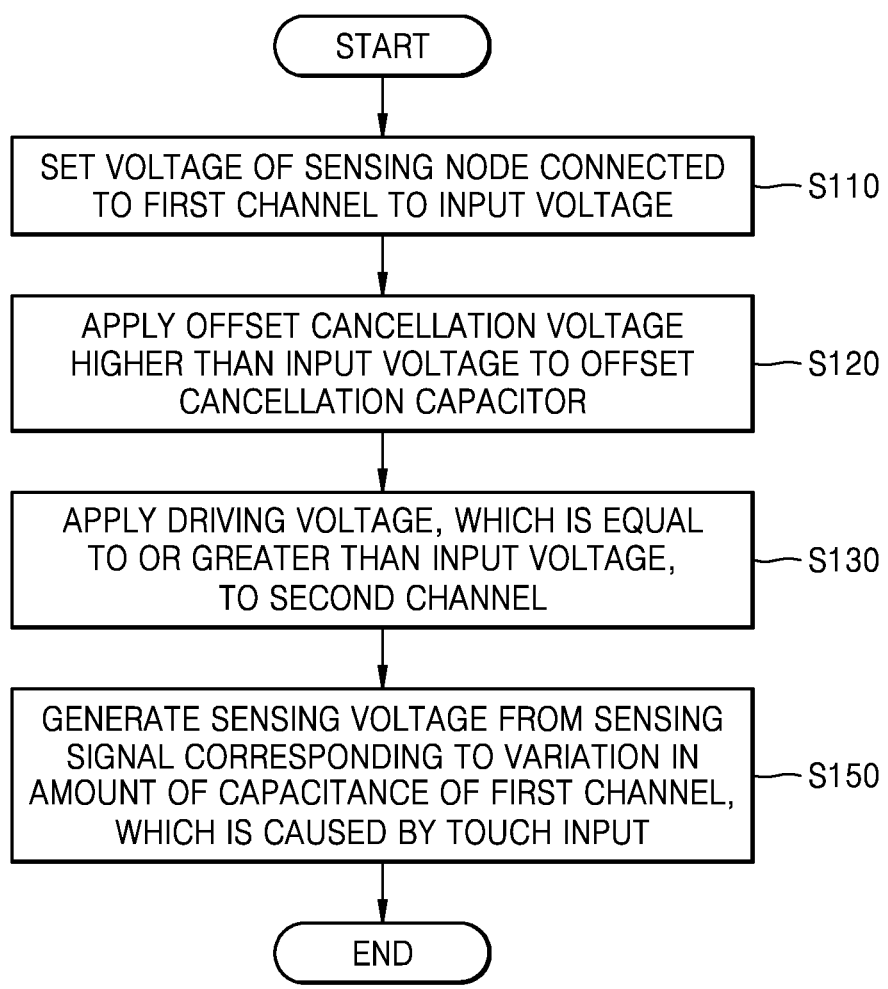
FIG. 13 is a flowchart illustrating a touch sensing method according to another exemplary embodiment.

FIG. 13 is a flowchart illustrating a touch sensing method according to another exemplary embodiment.

Referring to FIG. 13, the touch sensing method according to the current exemplary embodiment is an operation of sensing whether a touch input is applied to a touch screen panel and a position where the touch input is applied to the touch screen panel, according to a self capacitance sensing method. The touch sensing method according to the current exemplary embodiment is a modified embodiment of the touch sensing method of FIG. 12, and may further include operation S120 compared to the touch sensing method of FIG. 12. Accordingly, details described above with reference to FIG. 12 may be applied to the current exemplary embodiment, and thus, repeated descriptions will be omitted.

In operation S110, the voltage of a sensing node connected to a first channel is set to an input voltage. In operation S120, an offset cancellation voltage that is higher than the input voltage is applied to an offset cancellation capacitor. For example, the offset cancellation voltage may correspond to twice the input voltage. In some exemplary embodiments, the operation S110 and the operation S120 may be substantially simultaneously performed. In some exemplary embodiments, the operation S110 may be performed after the operation S120.

In operation S130, a driving voltage that is equal to or greater than the input voltage is applied to a second channel. In some exemplary embodiments, the operation S110 through the operation S130 may be substantially simultaneously performed. In some exemplary embodiments, the operation S110 may be performed after the operation S130. In some exemplary embodiments, the operation S120 may be performed after the operation S130. In operation S150, a sensing voltage is generated from a sensing signal corresponding to a variation in an amount of self capacitance of the first channel, which is caused by a touch input.

Figure 14:
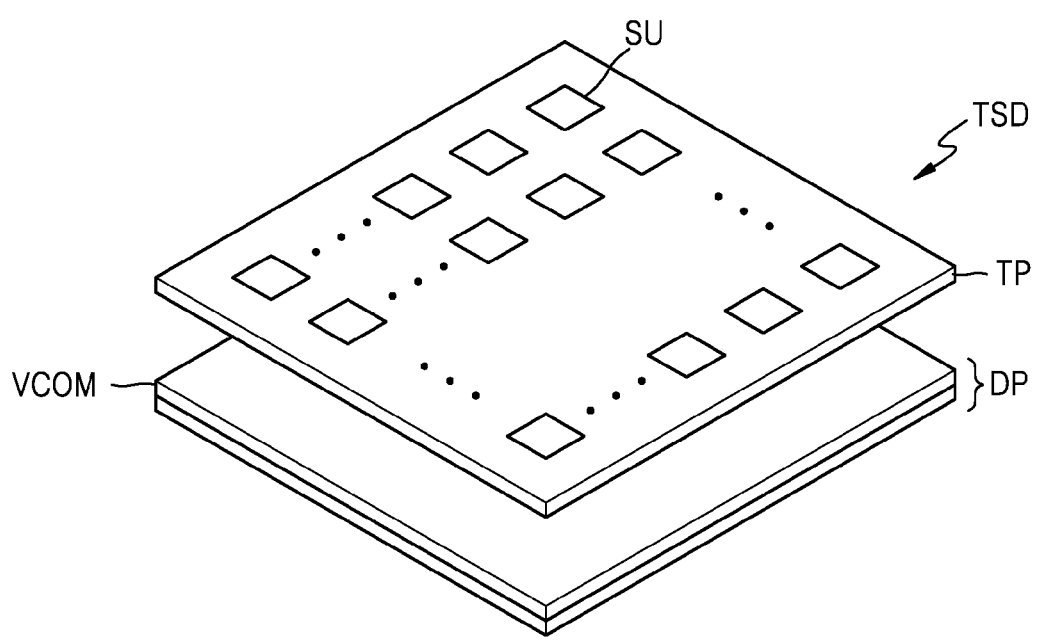
FIG. 14 is a diagram illustrating a touch panel and a display panel included in a touch sensing device according to an exemplary embodiment.

FIG. 14 is a diagram illustrating a touch panel TP and a display panel DP included in a touch sensing device TSD according to an exemplary embodiment.

Referring to FIG. 14, the touch sensing device TSD may include the touch panel TP and the display panel DP. The touch sensing device 100 of FIG. 1 and the touch sensing device 100a of FIG. 2 may be implemented like the touch sensing device TSD shown in FIG. 14.

The display panel DP may be a liquid crystal display (LCD), a light emitting diode (LED) display, an organic LED (OLED) display, an active-matrix OLED (AMOLED) display, or a flexible display, or may be other various types of flat panel displays.

In terms of process or price competitiveness, the touch panel TP may be integrated with the display panel DP. In FIG. 14, the touch panel TP is disposed on the display panel DP. However, the structure is not limited thereto, and the touch panel TP may also be disposed under the display panel DP. The touch panel TP may be spaced apart from the display panel DP by a predetermined distance or attached to an upper plate of the display panel DP.

As illustrated in FIG. 14, the display panel DP is of an on-cell type and is a separate panel or layer from the touch panel TP, but the inventive concept is not limited thereto. In some exemplary embodiments, the display panel DP may be of an in-cell type in which display pixels for display and a sensing unit SU for sensing a touch are formed in the same layer.

Figure 15:
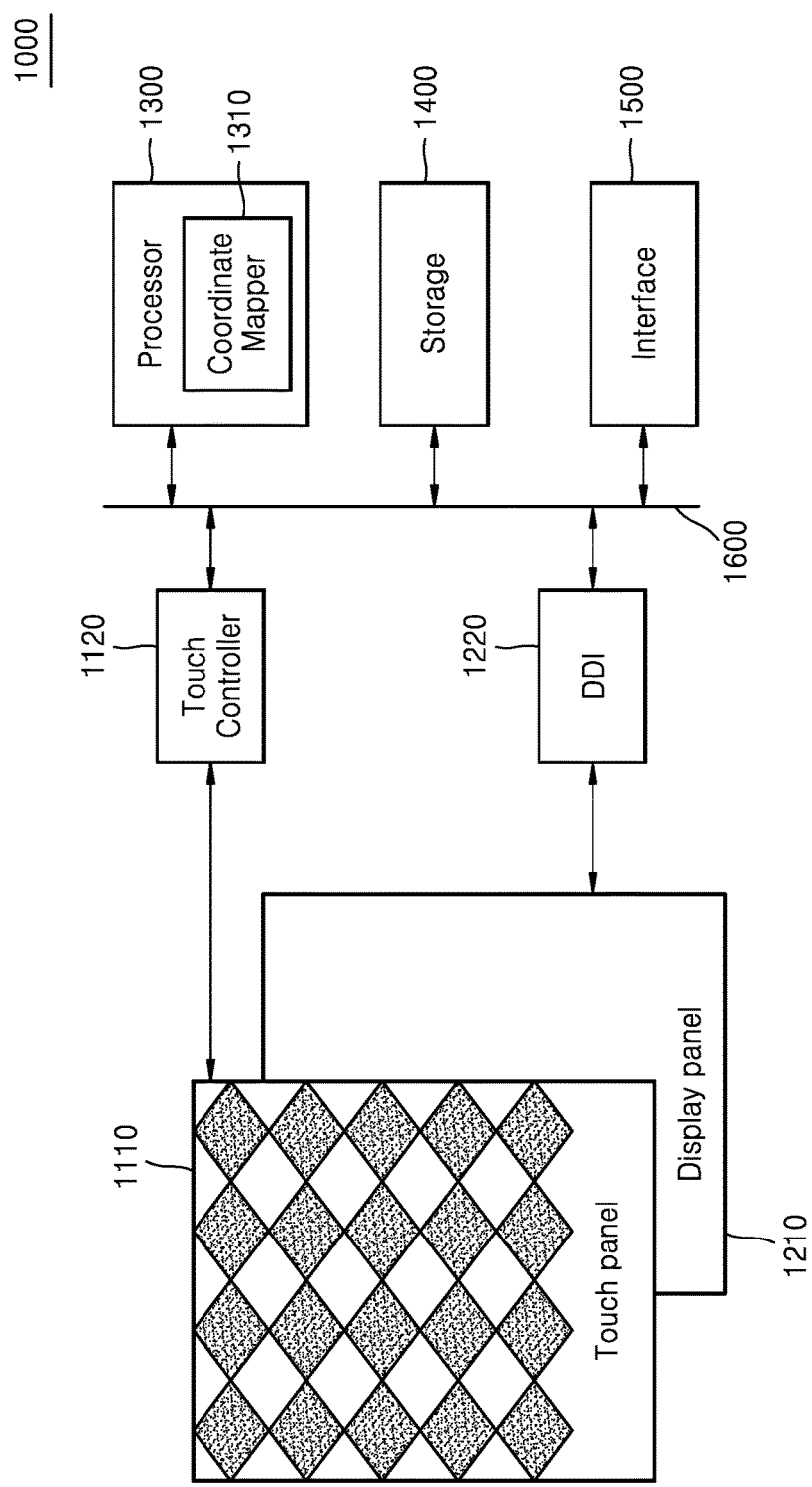
FIG. 15 is a block diagram of a touch screen system according to an exemplary embodiment.

FIG. 15 is a block diagram of a touch screen system 1000 according to an exemplary embodiment.

Referring to FIG. 15, the touch screen system 1000 may include a touch panel 1110, a display panel 1210, a touch controller 1120, a display driving circuit 1220, a processor 1300, a storage device 1400, an interface 1500, and a bus 1600.

The touch panel 1110 is configured to sense a touch event generated at each point. The display panel 1210 may be configured as various types of panels, such as LCD, LED, and OLED, that are configured to display an image. The touch panel 1110 and the display panel 1210 may be integrally formed to overlap each other.

The touch controller 1120 may control an operation of the touch panel 1110 and transmit an output of the touch panel 1110 to the processor 1300. The touch controller 1120 may be the touch controller 100 or 100a (see FIGS. 1 and 2) according to the exemplary embodiment described above. In a self capacitance sensing mode, the touch controller 1120 may receive a sensing signal from a first channel, and may detect whether there is a touch input and a position of the touch input, based on the received sensing signal. Also, the touch controller 1120 may provide a driving signal to a second channel crossing the first channel in the self capacitance sensing mode. In addition, the touch controller 1120 may cancel offset capacitance from a sensing signal received from the touch panel 1110.

The display driving circuit 1220 controls the display panel 1210 so as to display an image on the display panel 1210. Although not illustrated in FIG. 15, the display driving circuit 1220 may include a source driver, a grayscale voltage generator, a gate driver, a timing controller, a power supply unit, and an image interface. Image data to be displayed on the display panel 1210 may be stored in the memory via the image interface, and may be converted to an analog signal by using grayscale voltages generated by the grayscale voltage generator. The source driver and the gate driver may drive the display panel 1210 in response to a vertical synchronization signal and a horizontal synchronization signal provided by the timing controller.

The processor 1300 may execute commands and control an overall operation of the touch screen system 1000. Program codes or data which are required by the processor 1300 may be stored in the storage device 1400. The interface 1500 may communicate with an external device and/or system.

The processor 1300 may include a coordinates mapping unit 1310. Positions on the touch panel 1110 and positions on the display panel 1210 may be mapped with each other, and the coordinates mapping unit 1310 may extract corresponding coordinates of the display panel 1210 corresponding to a touch point on the touch panel 1110 where a touch input is generated. A user may perform an input action, such as touching, dragging, pinching, stretching, and a single touch or multiple touches, to select and control icons, menu items, or images displayed on the display panel 1210, based on the coordinates mapping between the touch panel 1110 and the display panel 1210.

According to some exemplary embodiments, the touch screen system 1000 may be a smart home appliance having an image display function. For example, the smart home appliance may include at least one selected from a television, a digital video disk (DVD) player, an audio, a refrigerator, an air conditioner, a cleaner, an oven, a microwave oven, an air cleaner, a set-top box, a TV box (e.g., Samsung HomeSync™, Apple TV™, or Google TV™), game consoles, electronic dictionary, electronic keys, camcorders, or electronic frames.

According to some exemplary embodiments, the touch screen system 1000 may include at least one selected from various medical equipment (e.g., magnetic resonance angiography (MRA), magnetic resonance imaging (MRI), computed tomography (CT), tomography, ultrasound equipment), a navigation device, a global positioning system (GPS) receiver, an event data recorder (EDR), a flight data recorder (FDR), an automobile infotainment device, shipping electronic equipment (e.g., navigation devices and gyrocompass or the like), avionics, security equipment, head units for vehicles, industrial or home robots, automatic teller's machine (ATM) of financial institutions, and point of sales (POS) of shops.

According to some exemplary embodiments, the touch screen system 1000 may include at least one selected from a portion of a furniture, a building, or a structure that includes an image display function, an electronic board, an electronic signature receiving device, a projector, and various measurement equipment (e.g., water supply, electricity, gas, or radiowave measurement equipment). The electronic device including the touch screen system according to various exemplary embodiments may be one or combination of the above-described various devices. Also, the touch screen system may be a flexible device. It will be obvious to one of ordinary skill in the art that the touch screen system according to the various exemplary embodiments is not limited to the above-described devices.

Figure 16:
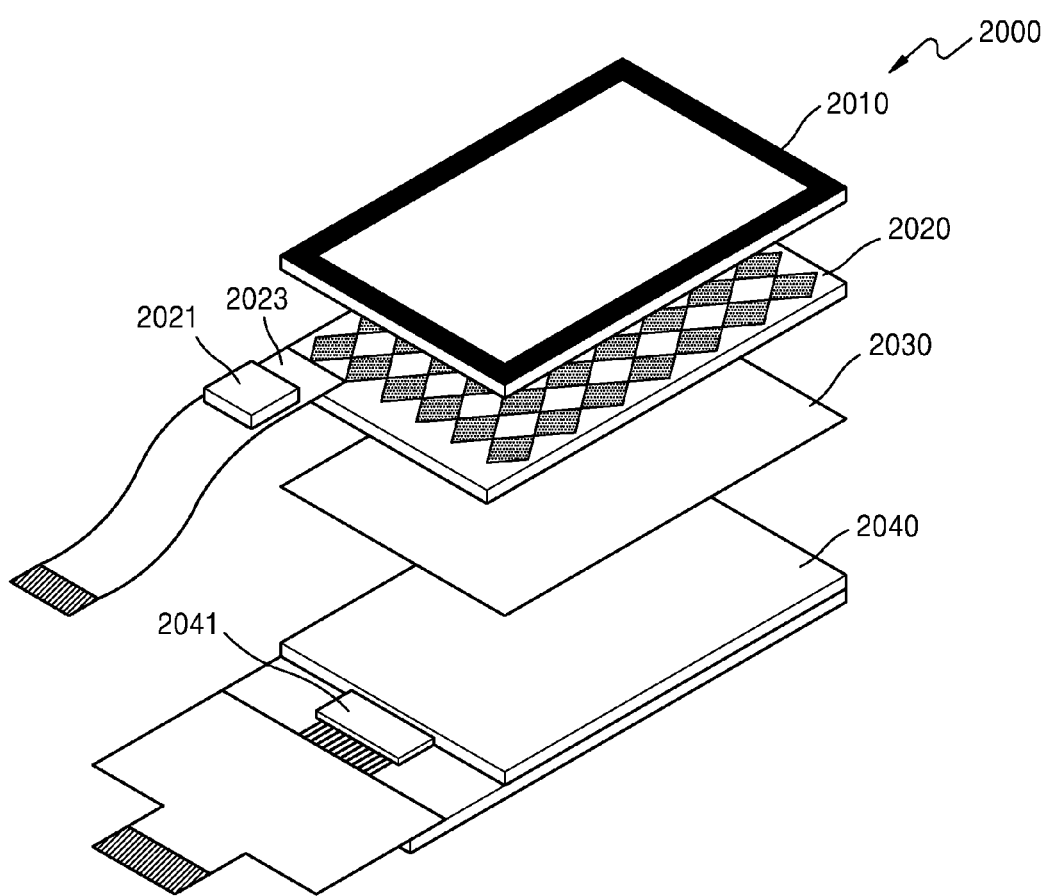
FIG. 16 is a diagram illustrating a touch screen module including a touch sensing device according to an exemplary embodiment.

FIG. 16 is a diagram illustrating a touch screen module 2000 including a touch sensing device according to an exemplary embodiment.

Referring to FIG. 16, the touch screen module 2000 may include a window glass 2010, a touch panel 2020, and a display panel 2040. Also, a polarizing plate 2030 may be disposed between the touch panel 2020 and the display panel 2040 to improve optical characteristics.

The window glass 2010 is formed of an acryl or reinforced glass so as to protect the touch screen module 2000 from external impact or scratches due to repeated touches. The touch panel 2020 may be formed by patterning a transparent electrode such as an indium tin oxide (ITO) on a glass substrate or a polyethylene terephthalate (PET) film. The touch controller 2021 may be mounted on a flexible printed circuit board (FPCB) in the form of a chip on board (COB), and may sense a touch event on the touch panel 2020 to extract touch coordinates and provide the touch coordinates to a host controller.

The display panel 2040 is typically formed by bonding two glasses as an upper plate and a lower plate. The display panel 2040 includes a plurality of pixels to display frames. According to an exemplary embodiment, the display panel 2040 may be a liquid crystal panel. However, the inventive concept is not limited thereto, and the display panel 2040 may include various types of display devices. For example, the display panel 2040 may be one selected from an organic light emitting diode (OLED), an electrochromic display (ECD), a digital mirror device (DMD), an actuated mirror device (AMD), a grating light value (GLV), a plasma display panel (PDP), an electro luminescent display (ELD), a light emitting diode (LED) display, and a vacuum fluorescent display (VFD).

The display driving circuit 2041 may be mounted on a printed circuit board as a COG as illustrated. However, the structure is exemplary, and the display driving circuit 2041 may be mounted in other various forms such as a chip on film (COF) or a chip on board (COB). While the display driving integrated circuit 2130 is illustrated as a single chip in the current exemplary embodiment, this is merely for convenience of illustration, and a plurality of display driving integrated chips may also be mounted. Also, the touch controller 2021 may be integrated into a single semiconductor chip with the display driving circuit 2041.

Figure 17A:
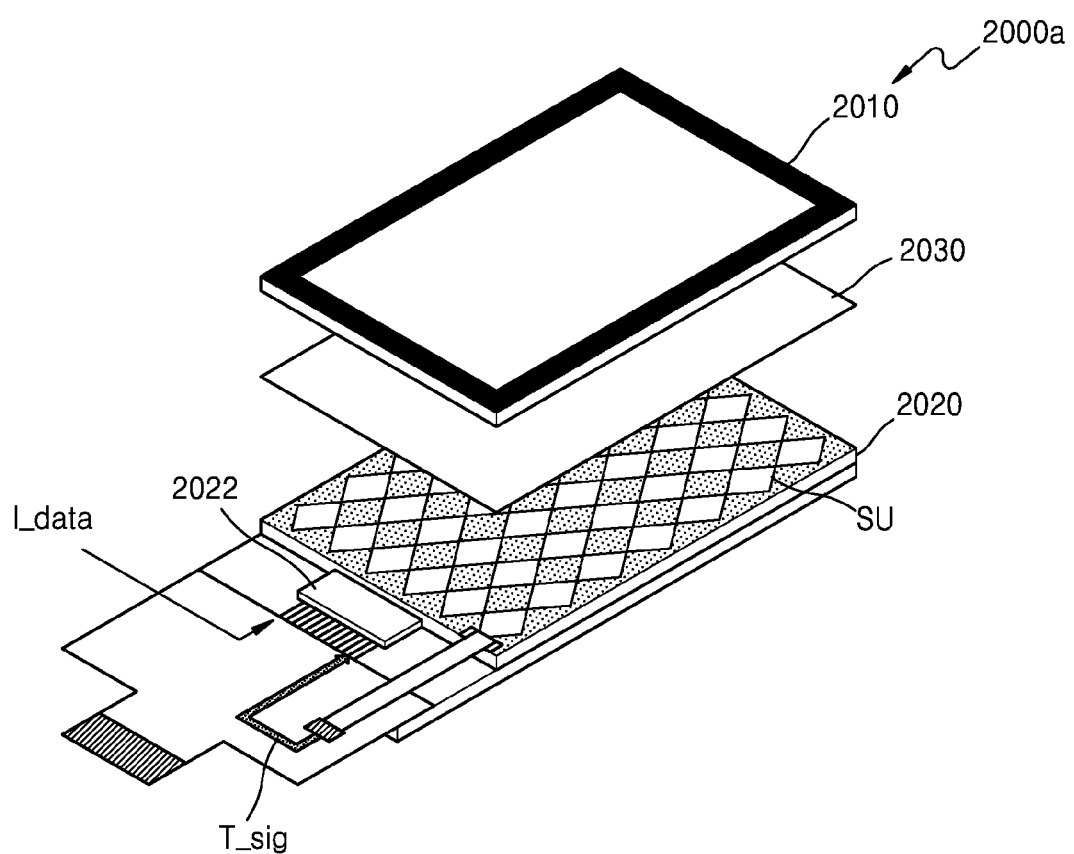
FIGS. 17A and 17B is a diagram illustrating a structure of a touch screen module in which a touch panel and a display panel are integrated, according to an exemplary embodiment.
Figure 17B:
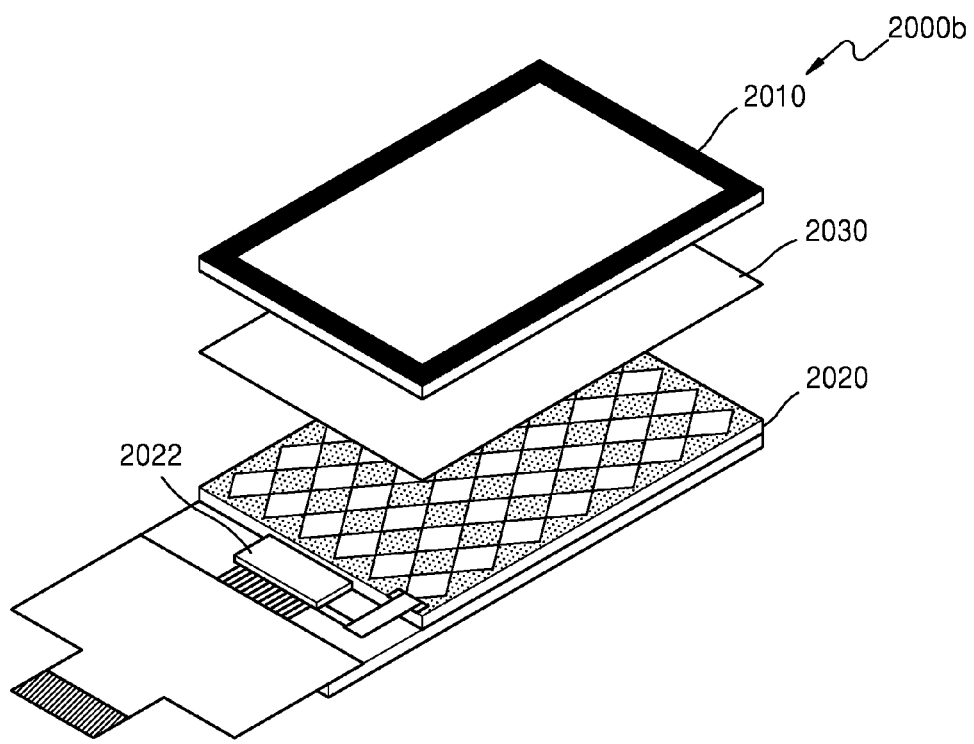

FIGS. 17A and 17B is a diagram illustrating a structure of a touch screen module 2000*a* in which a touch panel and a display panel are integrated, according to an exemplary embodiment.

As illustrated in FIG. 17A, the touch screen module 2000*a* may include a window glass 2010, a display panel 2020, and a polarizing plate 2030. In particular, in regard to formation of the touch panel, the touch panel is not formed on an additional glass substrate but formed by patterning a transparent electrode in an upper plate of the display panel 2020. FIG. 17A illustrates that a plurality of sensing units SU are formed in an upper plate of the display panel 2020. In addition, when a panel structure as described is formed, a touch controller and a display driving circuit may be integrated into a single semiconductor chip 2022.

When the touch controller and the display driving circuit are integrated into the single semiconductor chip 2022, a voltage signal T_sig from a sensing unit SU and image data I_data from an external host are provided to the semiconductor chip 2022. Also, the semiconductor chip 2022 may process the image data I_data to generate grayscale data to drive an actual display device, and provides the grayscale data to the display panel 2020. To this end, the semiconductor chip 2022 may include a pad related to touch data T_data and pad related to the image data and grayscale data (not shown). The semiconductor chip 2022 may receive a touch data voltage signal T_sig from the sensing unit SU via a conductive line connected to a side of the touch panel. When disposing the pads on the semiconductor chip 2022, in order to reduce data noise, the pad that receives the touch data voltage T_sig may be disposed close to the conductive line via which the voltage signal T_sig is to be transmitted.

Although not illustrated in FIG. 17A, if a conductive line for providing grayscale data to a display panel is disposed opposite the conductive line which the touch data voltage signal T_sig is transmitted, the pad for providing the grayscale data may also be disposed opposite the pad that receives the voltage signal T_sig.

The touch screen module 2000b of FIG. 17B has an approximately similar structure to the touch screen module 2000a; a voltage signal from the sensing unit SU is not provided to the semiconductor chip 2022 via a FPCB but directly to the semiconductor chip 2022 via a conductive line.

Figure 18:
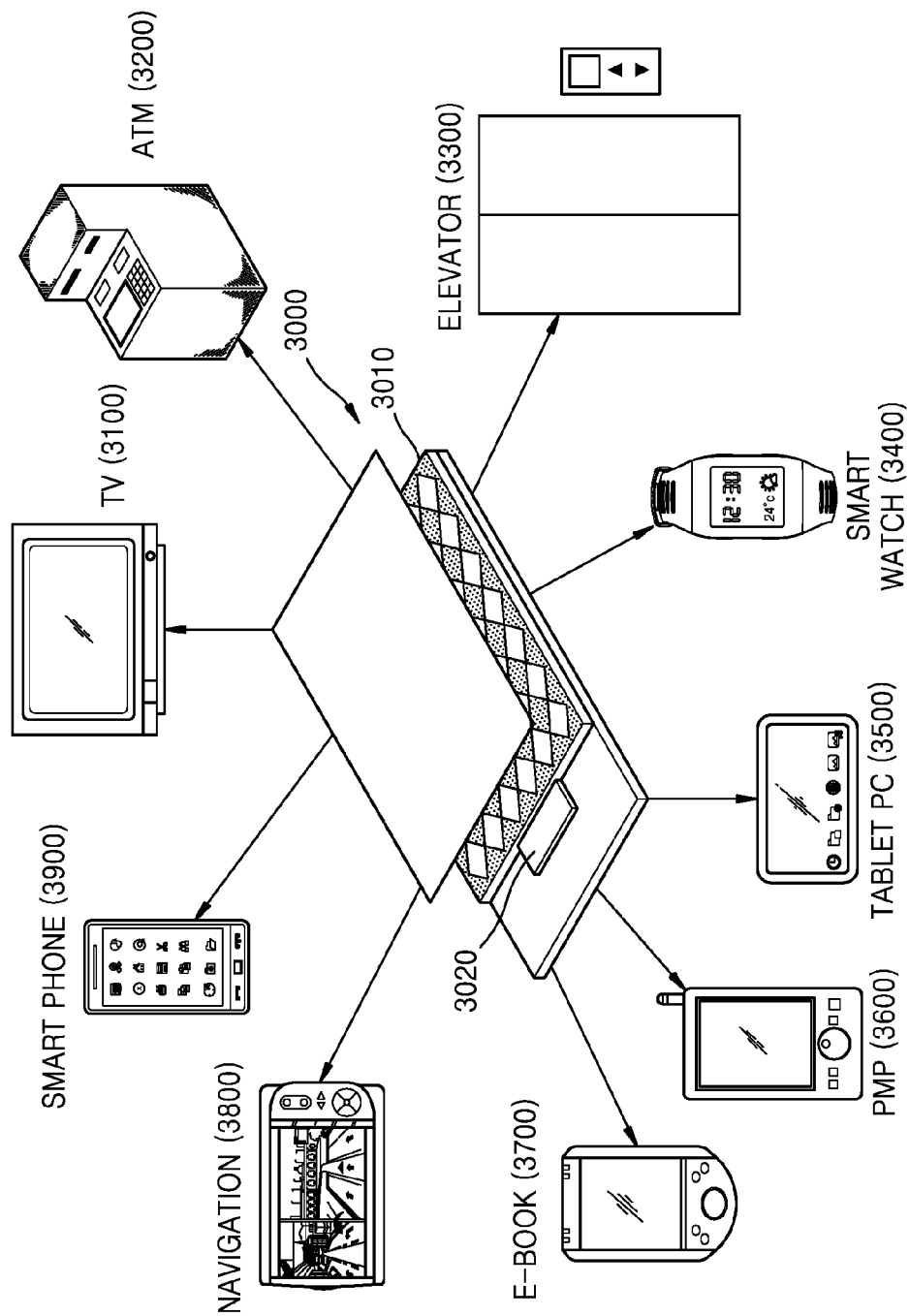
FIG. 18 is a diagram illustrating application examples of various electronic products in which a touch sensing device according to an exemplary embodiment is mounted.

FIG. 18 is a diagram illustrating application examples of various electronic products in which a touch sensing device 3000 according to an exemplary embodiment is mounted.

Referring to FIG. 18, the touch sensing device 3000 according to the exemplary embodiment may be used in various electronic products. The touch sensing device 3000 may be used in a smartphone 3900, a TV 3100, an automatic teller machine (ATM) 3200, an elevator 3300, a smart watch 3400, a tablet PC 3500, a PMP 3600, an e-book 3700, or a navigation device 3800.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion At least one of the components, elements, modules or units represented by a block as illustrated in FIG. 2 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like While the inventive concept has been particularly shown and described with reference to exemplary embodiments thereof, it will be understood that various changes in form and details may be made therein without departing from the spirit and scope of the following claims.

What is claimed is:

1. A touch screen controller comprising:
an offset cancellation circuit configured to cancel offset capacitance of a touch screen panel comprising a first channel and a second channel crossing the first channel, the offset cancellation circuit connected to the touch screen panel through a sensing node;
a charge amplifier configured to generate a sensing voltage from a sensing signal output from the touch screen panel, the charge amplifier comprising an amplifier having a first input terminal connected to the sensing node and a second input terminal to which a first driving voltage is applied in a self capacitance sensing mode for the first channel, the first driving voltage being provided to the first channel to generate the sensing signal; and
a channel driver configured to provide a second driving voltage, which is equal to or greater than the first driving voltage, to the second channel in the self capacitance sensing mode for the first channel.

2. The touch screen controller of claim 1, wherein the offset cancellation circuit comprises an offset cancellation capacitor having capacitance that is less than offset self capacitance of the first channel.

3. The touch screen controller of claim 2, wherein the offset cancellation capacitor has a first terminal connected to the sensing node and a second terminal to which an offset cancellation voltage higher than the first driving voltage is applied.

4. The touch screen controller of claim 3, wherein the offset cancellation voltage is twice the first driving voltage.

5. The touch screen controller of claim 3, wherein the channel driver provides the second driving voltage corresponding to k times the first driving voltage to the second channel in the self capacitance sensing mode for the first channel, wherein k is an integer that is equal to or greater than 1.

6. The touch screen controller of claim 5, wherein the capacitance of the offset cancellation capacitor corresponds to Cs−(k−1)*Cm,
wherein Cs is the offset self capacitance of the first channel, and Cm is offset mutual capacitance between the first channel and the second channel.

7. The touch screen controller of claim 5, wherein capacitance of the sensing signal corresponds to ΔCs+(k−1)*ΔCm,
wherein ΔCs is a variation in an amount of self capacitance of the first channel, and ΔCm is a variation in an amount of mutual capacitance between the first channel and the second channel.

8. The touch screen controller of claim 2, wherein offset mutual capacitance between the first channel and the second channel cancels at least some of the offset self capacitance.

9. The touch screen controller of claim 1, wherein a level of the sensing signal increases due to a variation in an amount of mutual capacitance between the first channel and the second channel.

10. The touch screen controller of claim 1, wherein the amplifier further comprises an output terminal outputting the sensing voltage,
wherein the charge amplifier further comprises a feedback capacitor connected between the first input terminal and the output terminal.

11. The touch screen controller of claim 1, wherein the second driving voltage has a square wave form.

12. A touch sensing device comprising:
a touch screen panel configured to sense a touch or proximity input, the touch screen panel including a first channel and a second channel crossing the first channel; and
a touch screen controller configured to provide a first driving voltage to the first channel in a self capacitance sensing mode for the first channel, provide a second driving voltage to the second channel in the self capacitance sensing mode for the first channel, and sense a variation in an amount of capacitance of the first channel, caused by the touch or proximity input,
wherein the touch screen controller further comprises a charge amplifier configured to generate a sensing voltage from a sensing signal output from the touch screen panel, and
wherein the charge amplifier comprises an amplifier having a first input terminal connected to a sensing node between the touch screen panel and the touch screen controller and a second input terminal to which the first driving voltage is applied in the self capacitance sensing mode, the first driving voltage being provided to the first channel to generate the sensing signal.

13. The touch sensing device of claim 12, wherein the touch screen controller comprises an offset cancellation circuit configured to cancel offset capacitance of the touch screen panel,
wherein the offset cancellation circuit comprises an offset cancellation capacitor having capacitance that is less than offset self capacitance of the first channel.

14. The touch sensing device of claim 13, wherein the touch screen controller further comprises a channel driver configured to provide the second driving voltage, which is equal to or greater than the first driving voltage, to the second channel.

15. The touch sensing device of claim 14, wherein the channel driver provides the second driving voltage corresponding to k times the first driving voltage to the second channel, k being an integer that is equal to or greater than 1, and the offset cancellation capacitor has a first terminal connected to the sensing node and a second terminal to which a voltage that is twice the first driving voltage is applied.

16. A touch sensing device comprising:
a touch screen panel configured to sense a touch or proximity input, and comprising:
a first channel and a second channel crossing the first channel; and
an offset self capacitor and an offset mutual capacitor configured to have offset self capacitance and offset mutual capacitance, respectively, when an input voltage is applied to the first channel, and
a touch screen controller configured to sense a variation in an amount of capacitance of the first channel caused by the touch or proximity input, and generate a sensing voltage from a sensing signal output from the touch screen panel,
wherein the touch screen controller comprises an offset cancellation capacitor connected to the offset self capacitor and the offset mutual capacitor of the touch screen panel, and
wherein the offset mutual capacitor along with the offset cancellation capacitor are configured to cancel at least some of the offset self capacitance.

17. The touch sensing device of claim 16, wherein the offset self capacitor is configured such that a voltage between both terminals thereof is equal to the input voltage Vin applied to the first channel,
wherein the offset mutual capacitor is configured to such that a voltage between both terminals thereof is equal to Vin−k*Vin, k being equal to or greater than 1, and
wherein the offset cancellation capacitor is configured to such that a voltage between both terminals thereof is equal to −Vin.

18. The touch sensing device of claim 16, wherein the touch screen controller further comprises:
a charge amplifier configured to generate the sensing voltage from the sensing signal output from the touch screen panel, and comprising an amplifier having a first input terminal connected to the offset cancellation capacitor and a second input terminal to which the input voltage is applied; and
a channel driver configured to provide a driving voltage, which is equal to or greater than the input voltage, to the second channel.

19. The touch sensing device of claim 16, wherein the offset cancellation capacitor is configured to have capacitance equal to Cs−(k−1)*Cm,
wherein Cs is the offset self capacitance, and Cm is the offset mutual capacitance.

* * * * *